United States Patent
Green

(10) Patent No.: US 10,657,634 B2
(45) Date of Patent: May 19, 2020

(54) SYSTEMS AND METHODS FOR IMAGE PROCESSING

(71) Applicant: Indiana University Research and Technology Corporation, Indianapolis, IN (US)

(72) Inventor: Jason Green, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 164 days.

(21) Appl. No.: 15/781,239

(22) PCT Filed: Dec. 2, 2016

(86) PCT No.: PCT/US2016/064641
§ 371 (c)(1),
(2) Date: Jun. 4, 2018

(87) PCT Pub. No.: WO2017/096178
PCT Pub. Date: Jun. 8, 2017

(65) Prior Publication Data
US 2018/0365819 A1    Dec. 20, 2018

Related U.S. Application Data

(60) Provisional application No. 62/263,621, filed on Dec. 5, 2015.

(51) Int. Cl.
*G06T 7/00* (2017.01)
*H04L 9/32* (2006.01)
(Continued)

(52) U.S. Cl.
CPC .......... *G06T 7/0002* (2013.01); *G06K 9/4652* (2013.01); *G06T 1/0042* (2013.01);
(Continued)

(58) Field of Classification Search
CPC .......... G11B 20/0021; G11B 20/00884; H04N 2005/91342; H04N 21/4405
See application file for complete search history.

(56) References Cited

U.S. PATENT DOCUMENTS 6,683,957 B1 * 1/2004 Shin ..................... H04N 19/172
324/309
7,428,639 B2 * 9/2008 Demos ..................... H04N 5/14
375/E7.089

(Continued)

OTHER PUBLICATIONS

International Preliminary Report on Patentability issued by The International Bureau of WIPO, dated Jun. 5, 2018, for International Application No. PCT/US2016/064641; 6 pages.
(Continued)

*Primary Examiner* — Yosef Kassa
(74) *Attorney, Agent, or Firm* — Faegre Drinker Biddle & Reath LLP

(57) ABSTRACT

Methods for processing an image comprising assigning values to a plurality of pixels of an image, placing the values of the plurality of pixels in an array, determining a method to reference the array values with indices, determining a method to rank or sort the values, sorting the array of values and storing the indices that would sort the array, sorting the array of indices and storing the indices that would sort the array in an array of values, recursively applying these methods, changing methods configurations and/or reusing them during processing, and altering an array based on a sorted array's values and/or indices are disclosed.

24 Claims, 26 Drawing Sheets

(51) Int. Cl.
*G06K 9/46* (2006.01)
*G06T 1/00* (2006.01)
*G09C 5/00* (2006.01)

(52) U.S. Cl.
CPC .............. *G09C 5/00* (2013.01); *H04L 9/3226* (2013.01); *G06T 2207/10024* (2013.01)

(56) References Cited

U.S. PATENT DOCUMENTS

| | | | | |
|---|---|---|---|---|
| 7,778,420 | B2* | 8/2010 | Kocher | G11B 20/00086 380/210 |
| 7,996,913 | B2* | 8/2011 | Kocher | G11B 20/00086 726/27 |
| 8,127,137 | B2* | 2/2012 | Levy | G06Q 20/401 348/509 |
| 8,488,834 | B2* | 7/2013 | Honsinger | G06T 1/0028 382/100 |
| 8,571,993 | B2* | 10/2013 | Kocher | G11B 20/00884 705/56 |
| 2004/0025025 | A1 | 2/2004 | Venkatesan et al. | |
| 2007/0160305 | A1 | 7/2007 | Demos | |
| 2007/0217689 | A1 | 9/2007 | Yang et al. | |
| 2015/0067008 | A1 | 3/2015 | Kamath et al. | |

OTHER PUBLICATIONS

International Search Report and Written Opinion issued by the ISA/US, Commissioner for Patents, dated Feb. 21, 2017, for International Application No. PCT/US2016/064641; 7 pages.

* cited by examiner

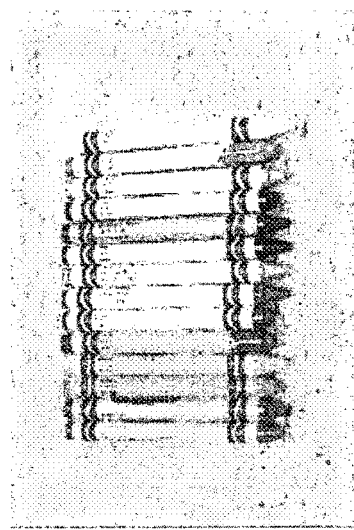
FIG. 10C
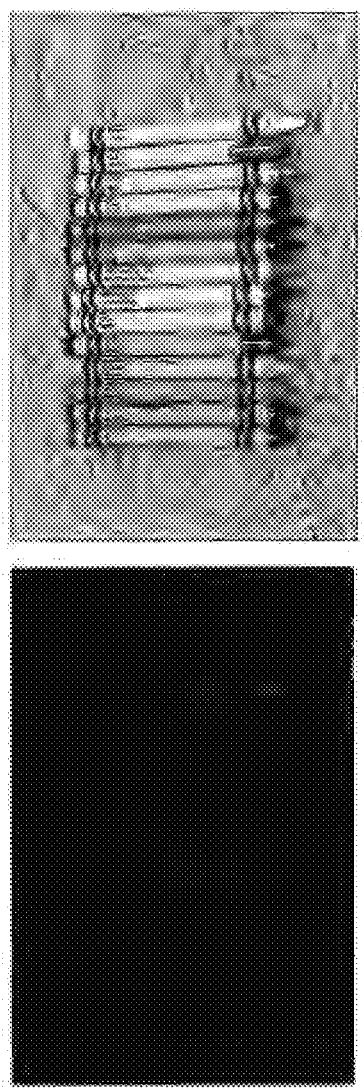
FIG. 10B
FIG. 10A
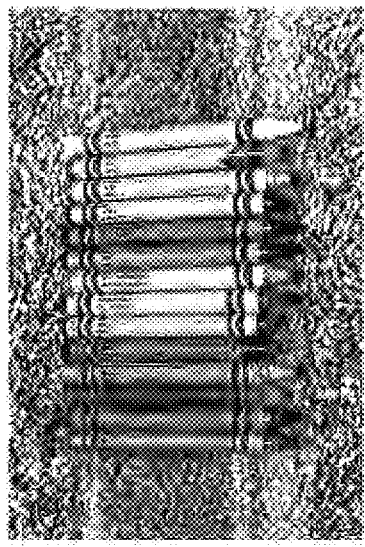
FIG. 10F
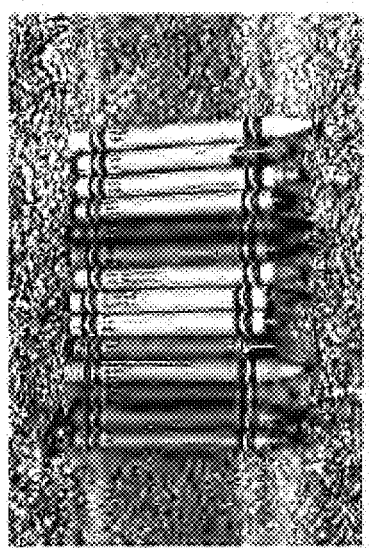
FIG. 10E
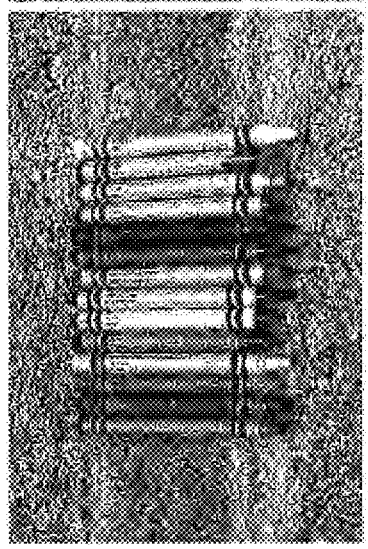
FIG. 10D

| Crayon Color | RGB (0-255) | AIS by column (0-255) | AIS by row (0-255) | AIS by row in TON (0-255) | ARIS (0-255) |
|---|---|---|---|---|---|
| Red | {201,045,039} | {228,025,055} | {172,055,075} | {108,100,110} | 240,084,101 |
| Magenta | {162,042,042} | {238,052,175} | {192,061,157} | {064,178,120} | 252,074,156 |
| Orange | {255,113,061} | {242,130,075} | {199,052,47} | {121,226,203} | 251,081,061 |
| Yellow | {241,183,078} | {225,234,046} | {237,243,196} | {139,253,252} | 244,222,092 |
| Brown | {252,173,125} | {170,033,013} | {245,164,168} | {081,097,161} | 231,129,062 |
| Green | {240,216,149} | {184,249,140} | {249,254,249} | {150,146,175} | 187,219,156 |
| Turquoise Blue | {210,208,191} | {100,235,237} | {141,235,194} | {245,161,155} | 136,206,184 |
| Robin's Egg Blue | {211,204,181} | {104,228,249} | {110,159,153} | {230,163,139} | 092,182,170 |
| Blue | {198,173,193} | {033,066,241} | {154,159,250} | {236,238,153} | 130,087,188 |
| Violet | {203,124,156} | {148,039,226} | {195,142,245} | {136,181,075} | 140,067,172 |

FIG. 10I

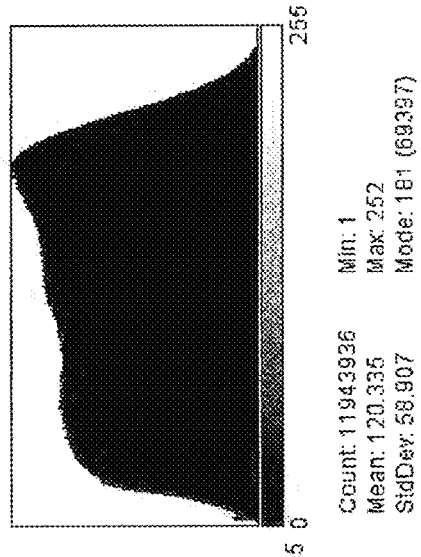
FIG. 12C
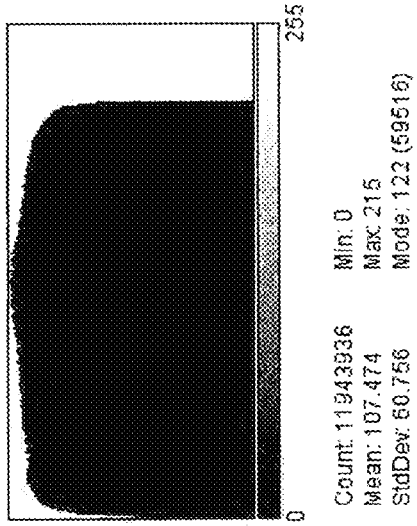
FIG. 12B
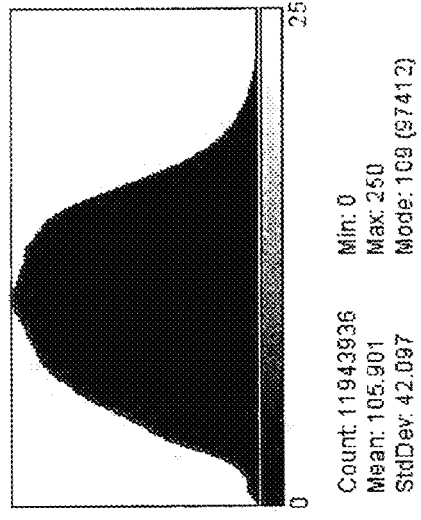
FIG. 12A
FIG. 12F
FIG. 12E
FIG. 12D

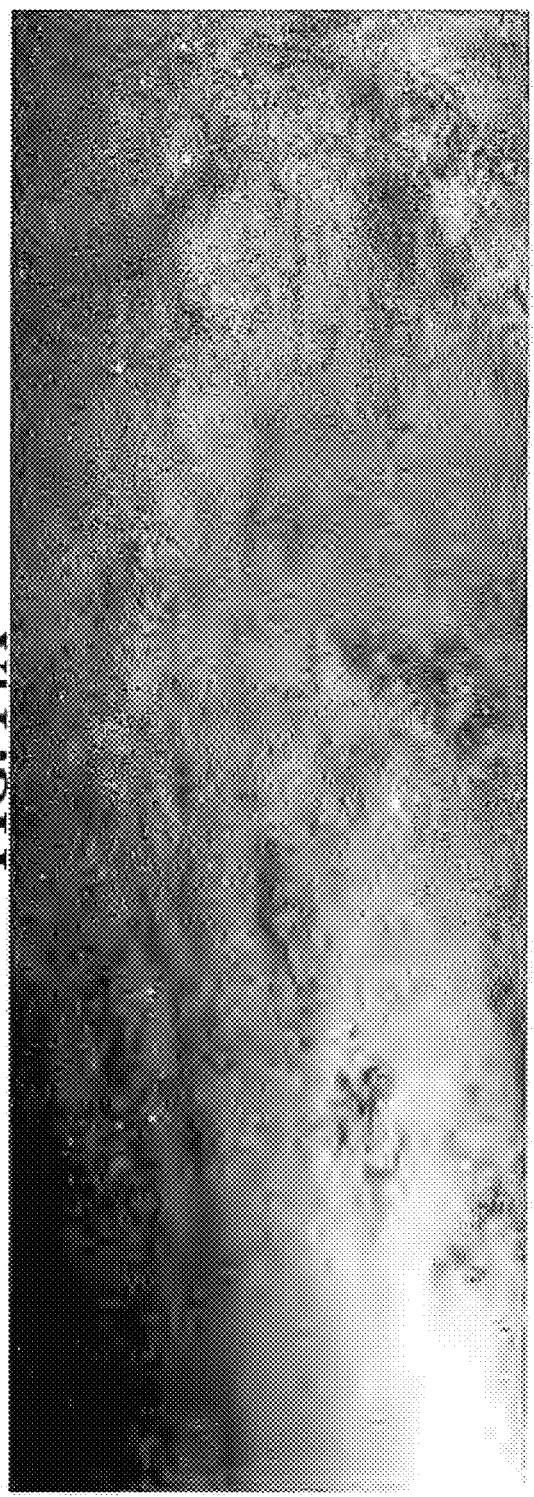
FIG. 14A
FIG. 14B

Count: 511520000  Min: 0
Mean: 86.012  Max: 255
StdDev: 70.708  Mode: 7 (7055880)

Count: 511520000  Min: 0
Mean: 126.824  Max: 254
StdDev: 76.370  Mode: 0 (34814347)

Count: 18024930   Min: 3
Mean: 32657.354   Max: 65413
StdDev: 18848.410  Mode: 50247 (71084)
Bins: 256         Bin Width: 255.508

SYSTEMS AND METHODS FOR IMAGE PROCESSING

CROSS-REFERENCE TO RELATED APPLICATIONS

This application is a U.S. National Stage Application under 35 U.S.C. § 371 of International Patent Application No. PCT/US2016/064641, filed Dec. 2, 2016, which claims the benefit of U.S. Provisional Patent Application No. 62/263,621, filed on Dec. 5, 2015, the entire disclosure each of which is incorporated by reference in its entirety.

GOVERNMENT LICENSE RIGHTS

This invention was made with government support under EY007624 and EY020017 awarded by the National Institute of Health. The Government has certain rights in the invention.

FIELD OF THE INVENTION

The present disclosure relates to array processing methods and systems, especially images. More specifically, this disclosure is related to array index sorting image processing methods and systems.

BACKGROUND

Images, such as a printed image or one displayed on a computer, may be understood as a transcribed representation of observation or imagination and, thus, subject to perceptional interpretation, both in creation and viewing.

For example, by way of illustration, when photographing a red rose flower, the physical and image representation may be dependent on many interrelated or independent factors, such as scene lighting, mechanism used, and viewing medium. For example, a rose that is illuminated with a light emitting diode (LED) consisting of only red, blue, and green wavelengths may appear different than if the rose were illuminated with natural broad spectrum blackbody radiation or solar light.

Accordingly, some images may require further processing, especially in such fields as astronomy or history, to ascertain details in images that currently are not visible. For example, some images may not accurately display details due to poor lighting. In other cases, the image viewer would like to identify the scene lighting origin itself. Thus, a need for the ability to process the image to reveal otherwise hidden or obscured details, and to enhance contrast, is needed.

Moreover, image processing may enable a tamper-resistant watermarking of images, to help prevent copyright infringement. Thus, a photographer may be able to mark images allowing for display, but can help to prevent unauthorized changes to copies thereof.

Furthermore, imaging processing may be used as a security feature, such as to encrypt information and/or to allow for the safe and secure transfer of electronic images and to prevent tampering.

A need therefore exists to improve image processing methods and systems.

SUMMARY

In some embodiments, methods for processing an image comprising assigning a value to a plurality of pixels of an image, placing the values of the plurality of pixels in an array, determining a sorting indices to sort the array, determining an output indices to sort the sorting indices, sorting the array with the sorting indices, sorting the array with the output indices, and altering the image based on the sorted array are disclosed.

Also disclosed are methods for processing an image including assigning a value to a plurality of pixels of an image, randomly placing the value of the plurality of pixels in an array, determining a sorting indices to sort the array, determining an output indices to sort the sorting indices, sorting the array with the sorting indices, sorting the array with the output indices, and altering the image based on the sorted array.

In various embodiments fixed selection of array pixels (e.g., by index)—proceeded by Array Index Sorting (AIS) processing—has been shown to produce an image with a moderately to nearly uniform histogram and, thus, increase image contrast and reveal formerly unseen features; recursive alternating fixed selection of array pixels—Array Index Sorting Authentic (AISA) 2-pass sorting—has been shown to reliably produce a quasi-unique array image of nearly uniform histogram, and so produces an array which is suitable to prevent tampering, protect copywrite, and for encryption purposes; random selection of array pixels (e.g., by index)—Array Random Index Sorting (ARIS) processing—has been shown to eliminate Type One Noise ("TON"), of which may be undesirable, and may also be applied as a watermarking technique and/or encryption technique, where an example embodiment is referred to as ARIS. Other embodiments, such as cropping or expanding an image to a certain size, scaling of array values, averaging of multiple frames, organizing and/or separately processing a plurality of frames (as in RGB images), have been shown to produce desirable end products, as related to AIS processing improvements, such as reducing Type Two Noise ("TTN"), altering color scaling, or setting the output image's dynamic range.

In some embodiments, the number of recursive loops may be set to increment until a desired point in time, such as exceeding X number of recursive loops, whereas other embodiments assessed the current array as compared to a previous recursive loop array, a pre-defined condition, or a changing or fixed characterization of the array. In particular, in some embodiments, such as various AISA methods, subtracting the current recursive loop array from the previous loop array may result in all values being zero (e.g., no change), thus indicating that recursive loop processing may be stopped as because a desirable point has been achieved. It has been shown that many of the embodiments disclosed herein may produce arrays of similar attributes to each other, though methods varied.

For example, various ARIS methods may be recursively preformed to produce an image array of nearly uniform histogram, as is also shown with AIS, AISA, and variations upon these various embodiments. Also, discretionary selection of array pixels (e.g., by index), rather than fixed or random selection, may produce arrays with AIS or AIS-like attributes, where generally speaking, the sorting process itself, no matter how fixed the method, may be thought to be an discretionary method invoker because array values and indices tend to vary between any given array that could be conceived or produced.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein:

FIGS. 10A-H illustrate images with underexposure, proper exposure, and overexposure and these respective images after processing according to various embodiments;

FIG. 10I illustrates the quantitative color data according to various embodiments;

FIGS. 12A-C illustrate an image of limestone and the limestone image after processing with AIS and ARIS sorting techniques according to various embodiments;

FIGS. 12D-F illustrate the histograms of the limestone images in FIGS. 12A-C;

FIGS. 14A-B illustrate an image of the Andromeda galaxy and the image of the Andromeda galaxy processed with MS processing according to various embodiments;

Figure 1:
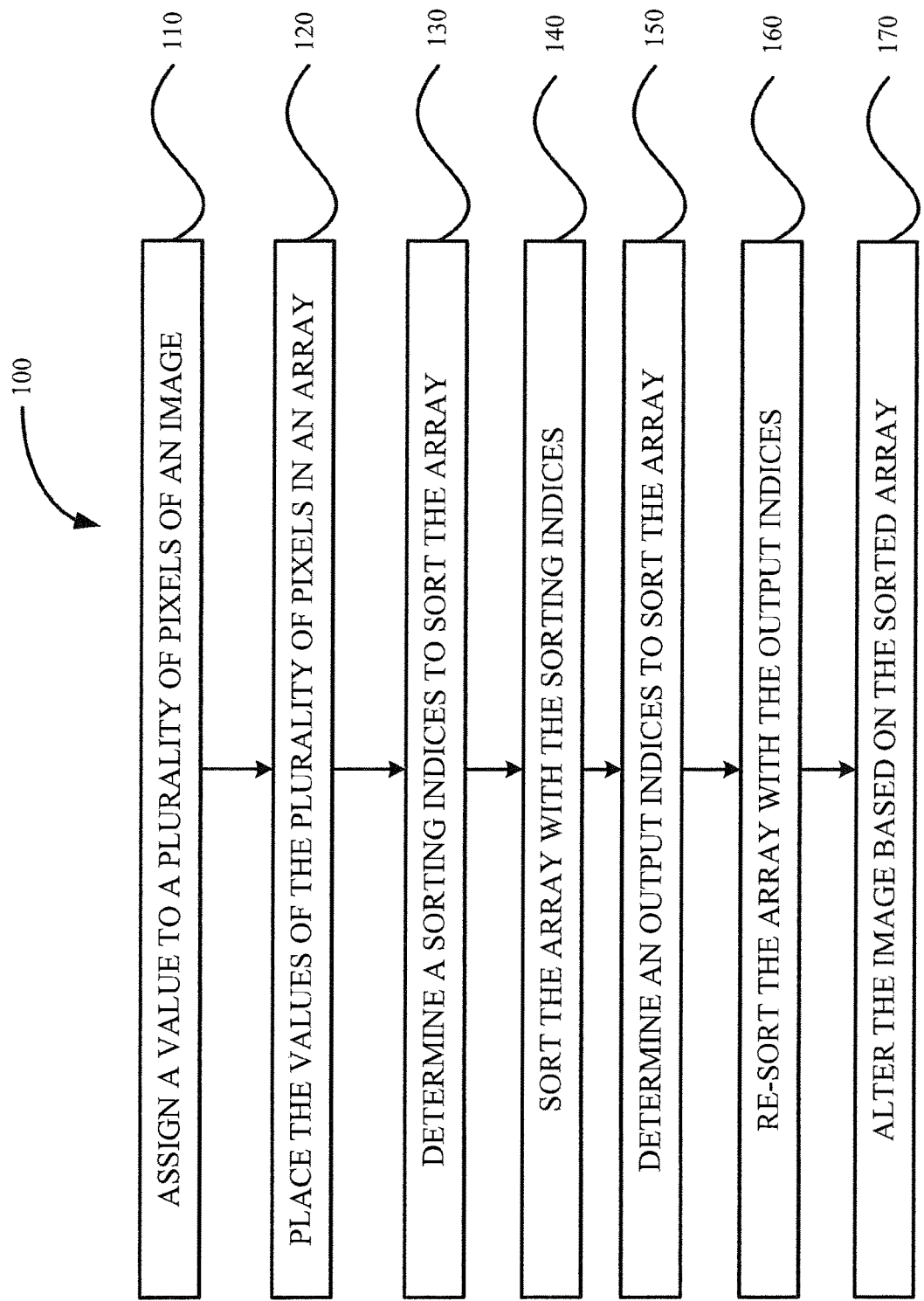
FIG. 1 illustrates a method of processing an image according to various embodiments.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates embodiments of the disclosure, in various forms, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize its teachings.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA, MATLAB, PYTHON or any other viable high-level programming language, or a combination of a high-level programming language and a lower level programming language or software.

In mathematics and computer science, an array is a type of data structure whose elements are stored and referenced by indices. For example, the following is a 3 row by 3 column array:

$$A = \begin{matrix} 8 & 1 & 6 \\ 3 & 5 & 7 \\ 4 & 9 & 2 \end{matrix}$$

Indexing the array may allow for reference to a group of elements or individual elements at one time. Some conventions may refer to the first row or column as the 0th row or column, and others may refer to the same row or column as the $1^{st}$ row or column.

For example, the notation A(1,1) could refer to the value 8 in one convention, and A(1,1) could refer to the value 5 in another convention. This disclosure is not limited by a particular convention and, with the benefit of this disclosure, a person of ordinary skill will understand the methods disclosed herein regardless of any convention that is used. Therefore, it is understood that both the array values and the array indices may have a ranking system which may be common between them.

In the above example of the array A, both the array values and the array indices are ranked via a base-10 numeric system. Other conventions (e.g., spreadsheet software) may instead refer to column elements as alphabetic such that those greater than the last letter in the alphabet are incremented with additional letters. For example, with an English alphabet system: A(27,AZ) could refer to the 27$^{th}$ row and 52n$^{nd}$ column. The array values (the data being stored) could also be alphabetic. Thus, the array values and/or indices may be a base-10 numeric value, an alphabetic character, symbolic, binary, hexadecimal value, or mixtures thereof. And thus, one set of indices may map to another set in a customizable manner—for example, numbers to letters—and so be useful for some embodiments such as serving as or producing an encryption codex and/or decryption codex.

Accordingly, this disclosure also includes non-transitory computer readable storage mediums bearing instructions for processing an image, the instructions, when executed by a processor in electrical communication with the storage medium, cause the processor to perform operations including methods discussed in other sections and FIGS. 1-5. Thus, the instructions may cause the processor to encrypt the image, decrypt the image, or a combination thereof.

If an image consists of more than two dimensions, such as RGB image, then each color channel can first be pulled out of the three dimensional array to create three separate two-dimensional arrays, AIS processed independently, then merged back together in a composite or stack. For example, some methods may include splitting the image into a plurality of separate arrays, one for each color channel, such as red, green, and blue. If the input array contains more than one dimension, either the row(s), column(s), or both may be sorted.

The methods described herein may not necessarily be limited by number of elements in an array, as they may include arrays of any size or shape, even those of whose elements change in size or shape as processing continues. Also, the dimensions of the array may not necessarily limit processing, as since an input array may include two dimensional arrays, three-dimensional arrays, four-dimensional arrays, or more.

FIG. 1 illustrates AIS method 100 for processing an image according to various embodiments. MS method 100 may include assigning a value to a plurality of pixels of an image (step 110), placing the values of the plurality of pixels in an array (step 120), determining a sorting indices that would sort the array (step 130), determining an output indices that would sort the sorting indices (step 150), sorting the array with the sorting indices (step 140), sorting the array with the output indices (step 160), and altering the image based on the sorted array (step 170). The order of the steps are not particularly limited and, thus, may vary between embodiments. For example, in some embodiments, the determination of the output indices (step 150) may come before the sorting of the array with the sorting indices (step 140), or may come after the sorting of the array with the sorting indices (step 140).

Moreover, various steps of the process may be repeated, for example, according to various criteria, such as a desired number of iterations, or until a desired result is achieved. Thus, various methods may be recursive. Moreover, the number of arrays are not limited and, thus, an image may be split into a plurality of arrays. For example, some methods may include splitting the image into an array for various color channel, such as red, green, and blue. Furthermore, some methods may include a plurality of arrays where there is an array for each color channel of the image.

Furthermore, various steps may be used in parallel and/or series prior to, during, or after the creation, merging, and/or modification of any array as described in any step.

As a technical example of AIS, arrays may be derived from images and reference to the programming language PYTHON, for example, of an image may be stored as a numpy array called "A", then a generalized exemplary manner in which a two dimensional (2D) AIS is accomplished is as follows:
  import NUMPY as np
  A=p # some predefined or defined array (1-D or 2-D)
  B=np.argsort(A,axis=0)
  C=np.argsort(B,axis=0)
And in the program MATLAB, and exemplary AIS process may be:
  A=p; % some predefined or defined array (1-D or 2-D)
  [val1, B]=sort(A,1);
  [val2, C]=sort(B,1);
where A is, for example, a single channel from a multi-channel image, B is the step at which the indices that would sort array A are returned, C is the output AIS array, or recognizable image, of which is the returned indices that would sort the indices at step B, and the terms "axis=0" and "1" specify which axis, e.g., row or column, is sorted. As used herein, the symbols # and % are comment apparatus that may inform a computer program to ignore any text that follows on the same line, and the semi-colon ";" is a line terminator symbol.

As a numerical example, if an input array is a 1 row by 5 column array,
  A=[4,3,10,3,11] is an intensity value array that has indices [0,1,2,3,4]
  B=[1,3,0,2,4] are the indices that would sort A
  C=[2,0,3,1,4] are the indices that would sort B
where the brackets and commas just indicate the convention in how the data is grouped (e.g., in an array).

In various embodiments, in the sorting events, each pixel may be ranked in order by value and the index position—not pixel value—of the sort is then stored such that each pixel in a given row or column (for example) is normalized both by its index position and by its original intensity value, of which is ranked against its peers in said row or column. When a sort order method is chosen (e.g., ascending or descending), it may be either be kept constant through the whole process, or varied.

Various steps and/or combinations of methods may be reconfigured and/or repeated, for example, according to various criteria, such as a desired number of iterations, or until a desired result is achieved. Thus, various methods may be recursive, where the output array of one or more method embodiments is utilized as the input array for additional method embodiment(s).

Figure 2:
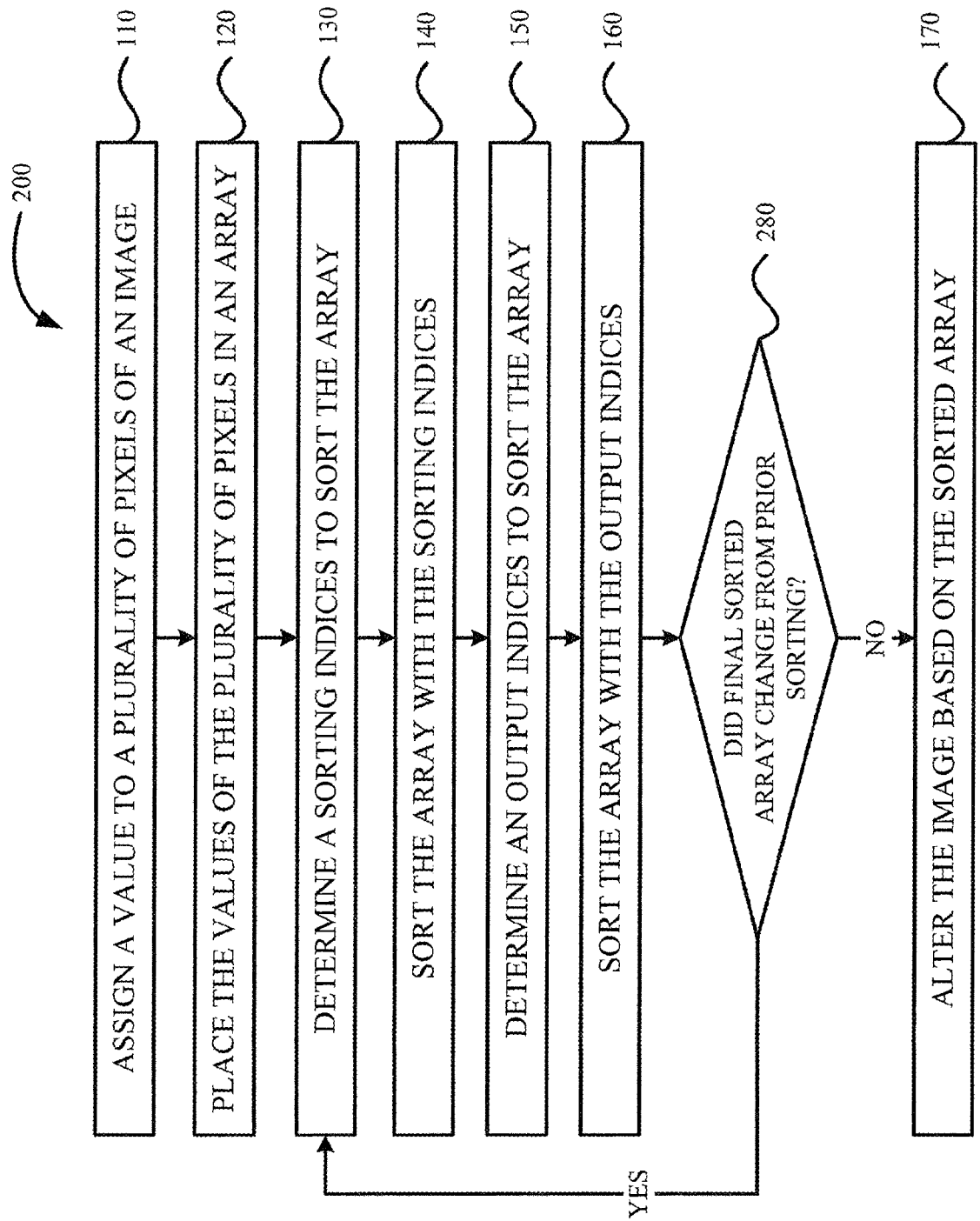
FIG. 2 illustrates a method of processing an image until the output array does not differ between steps according to various embodiments.

FIG. 2. shows an exemplary recursive AIS method 200 for processing an image. Similar to method 100, recursive AIS method 200 may include assigning a value to a plurality of pixels of an image (step 110), placing the values of the plurality of pixels in an array (step 120), determining a sorting indices that would sort the array (step 130), determining an output indices that would sort the sorting indices (step 150), sorting the array with the sorting indices (step 140), sorting the array with the output indices (step 160), and altering the image based on the sorted array (step 170). However, recursive AIS method 200 may include recursively sorting the array with the sorting indices and the output indices until a final sorted array does not differ from the sorted array (step 280).

Various AISA methods may produce an image that is its own watermark. By this it is meant that the image itself as a whole and/or part can be used to verify the authenticity of the image, and to do so, it has been shown that the same method that produced the array can be used to verify that array is authentic. For example, the first equation below may be used as a verification step (e.g., performed once) and an AISA producing step (to be performed each recursion loop when converting from non-AISA to AISA), where N and $N_{new}$ are recursive steps.

(Image $N_{new}$=N+1)−(Image N)=all zero-value pixels null image.

An AISA array and method has also been shown to be stenography or tampering resistant in that, during processing, each and every pixel is very likely to be modified in value by some amount. So, it may be difficult to apply, for example, quantization to an image prior to AISA processing, and yet maintain the effects of said quantization after. In particular, AISA is authenticable because at this point any change to pixel values or indices, whether local or macro, may be easily detected by another AISA processing, even if the image is cropped, scaled, or saved to a new file format (e.g., compressed). Accordingly, various embodiments disclosed herein may exclude altering the image after an AISA result, as this would destroy authenticity. Or, they may include altering an AISA image to become non-AISA and then performing a new AISA process such that now there exist two very similar arrays that are both AISA.

Thus, the authenticity of an image may be verified when transferred from one party to another according to various embodiments disclosed herein. For example, the receiving party may independently verify the authenticity of an array, for example by merely by performing another 2-pass AISA sort of an image processed in the same AISA method as the image was produced. Or, one party may produce a vast number of similar AISA arrays, but privately communicate which is an "heir" and which are "pretenders," each of which may been derived by AIS, AISA, ARIS, and/or some other process or even arbitrarily chosen among all candidates so as to strengthen the "heir's" authenticity by hiding it in plain sight. Thus, various methods described herein may allow for to certifying an array's identification.

Cropping, expanding, or otherwise resizing a non-AISA image to a certain number of rows and columns may expressly produce an output image, after AISA, of which is readily scaled for viewing purposes such that no alteration (such as step 170 in other embodiments) is needed after AISA. For example, a non-AISA image that is cropped to be 256 pixels wide by 256 pixels high, if converted to AISA, should become an 8-bit dynamic range image where, depending on embodiment method, the maximum intensity value will may also be 256 and no intensity value is absent because the AISA process automatically rescales the image based upon the number of pixels in the rows and columns and fills a new array with the original array's indices. This is because in various AISA and other embodiments the number of indices (e.g., number of pixel elements) the indices become the output array's values, and so if no input array indices are missing, no output array indices will be missing, and the maximum number of pixels in a given row or column will become the maximum value in the output processed array. So, this technique of cropping a non-AISA image should improve security and authenticity after the image becomes AISA—for example, because there is less incentive to modify the image. Pre-cropping may also be useful in other embodiments.

The AISA method may be distinguished in methodology from other embodiments by its use of a "2-pass sort". As used herein, "2-pass" may be understood as including performing 2 pairs of index sorting events and changing pixel selection methods between pairs (i.e., sorting the array with the sorting indices and sorting with the output indices). For example, an array may first be sorted by rows in one pair of sorting methods, and then proceed to be sorted by columns in the next pair, and then maintain this pattern throughout recursive processing. Alternatively and arbitrarily, it may first be sorted by columns in one pair and then by rows in the other pair. Further, a method may include alternating between the sorting of one row and then one column at a time until each row and column of the array has processed.

Recursive methods disclosed herein are not particularly limited to a particular embodiment, and thus, may be used with other embodiments. For example, various methods may allow for recursive processing for an discretionary number of loops rather than relying on some criteria to be met. Such a case is exemplified in FIG. 3.

Figure 3:
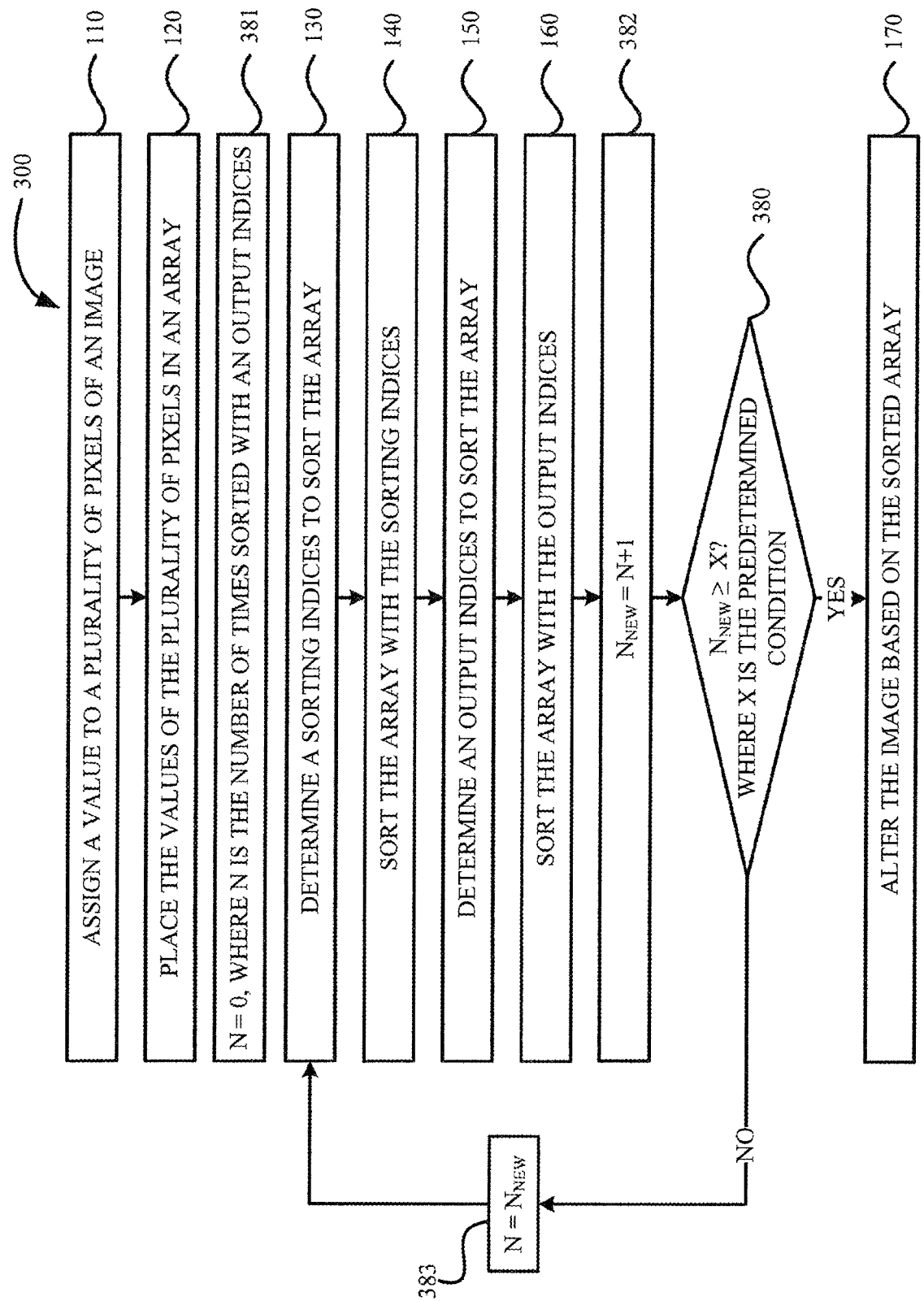
FIG. 3 illustrates a method of processing an image a desired amount of times according to various embodiments.

FIG. 3 illustrates a second exemplary recursive method 300 for processing an image. Similar to method 100, second exemplary recursive method 300 may include assigning a value to a plurality of pixels of an image (step 110), placing the values of the plurality of pixels in an array (step 120), determining a sorting indices that would sort the array (step 130), determining an output indices that would sort the sorting indices (step 150), sorting the array with the sorting indices (step 140), sorting the array with the output indices (step 160), and altering the image based on the sorted array (step 170).

However, second exemplary recursive method 300 may include recursively sorting the array until a predetermined condition "X" is reached (step 380). In various embodiments, the predetermined condition "X" may be a predefined limit to the number of recursion loops such that a loop counter may be used, as exemplified in FIG. 3 with step 381, step 382, and step 383 with the variable named "N" and "$N_{NEW}$", such that the recursive method may be terminated at an arbitrarily chosen time. For example:

Image($N_{new}$=N+1)>X

In this way, unlike AISA, no verification step is performed, but it may entirely be possible for the method as shown in FIG. 3 to produce a quasi-unique array before X occurs. Because the verification and production methods may not necessarily be identical, the quasi-unique array may not necessarily be AISA in terms of authenticity.

In some embodiments, the number of recursion loops "X" multiplied by the number of pixels deep "D" the sort that are required to produce a certain effect—such as a uniform histogram—may equal a constant and, thus X*D=constant because of input uniqueness of array intensity values and/or indices. For example, using an input bit depth that is 16 bit and has a filled histogram, if X=300 loops at D=65536 pixels deep per loop provides adequate AIS-like effect, then converting the input image to 8 bit first, and then ARIS processing would require 76,800 loops at 256 pixels sorting per loop. In some embodiments, both may achieve similar AIS effect.

Without being limited to any theory and building on the concepts disclosed herein, various embodiments may allow for any method to become discretionary rather than fixed, pre-planned, or otherwise rigid. For example, the order in which elements are selected to become discretionary or random. Thus, in some embodiments, methods may even become adaptive and, thus, may allow for re-ranking of the array values, indices, and/or the numeric, alphabetic, and/or symbolic system itself before, during, and/or after processing.

In various embodiments, some manner and/or mixture of fixed ranking and/or discretionary re-ranking may help to break the assumed intensity value of each element, or pixel, in the original array and may reassign each a value that depends upon the values and rank of other elements in the array, to the advantage of various applications. Thus, this combination of methodologies between fixed, discretionary, and/or random may be another useful embodiment, of which is also referred to as hybrid or mixed.

Accordingly, in some embodiments, the ranking system may be established before populating an array with data. However, it is within the scope of this disclosure to include methods where the ranking system does not remain fixed.

Thus, in some embodiments, the ranking system may be allowed to change arbitrarily before, during, or after data is processed. This "re-ranking" can be accomplished in a wide variety of methods known in the arts with the benefit of this disclosure. For example, a fixed method theme may include ranking a previously ranked array, or in other words, to sort the input array twice by index with fixed methodology whose ranking system is chosen beforehand, while an discretionary method theme may include re-ranking a previously re-ranked array, or in other words, to sort the input array twice by index but arbitrarily customizing the process anywhere before, during or after. For example, it may arbitrarily be invoked that ranking methodology varies (e.g., sometimes 2 is not always greater than 1). Or, other methods could include swapping pixel positions, swapping whole columns or rows, transposing columns into rows or vice versa, scaling pixels or indices by value, occasionally ranking the index row 1 (for example) to be of greater precedence than index row 2, etc. As a numerical example, $$A = \begin{matrix} 8 & 1 & 6 \\ 3 & 5 & 7 \\ 4 & 9 & 2 \end{matrix}$$

could become (note the 5 and 8 are swapped):

$$A = \begin{matrix} 5 & 1 & 6 \\ 3 & 8 & 7 \\ 4 & 9 & 2 \end{matrix}$$

Thus, a diverse spectrum of methods are available for applying the various methods disclosed herein, where, some methods may vary between fixed methodology to discretionary to random methodology, and to any combination therein.

For example, the Array Random Index Sorting ("ARIS") method may contain random and/or discretionary selection pixel elements. In this way, portions of the array may be taken in pieces or chunks such that the index of chosen pixels, then processed by AIS, AISA, and/or ARIS, and then returned to their original locations.

Figure 4:
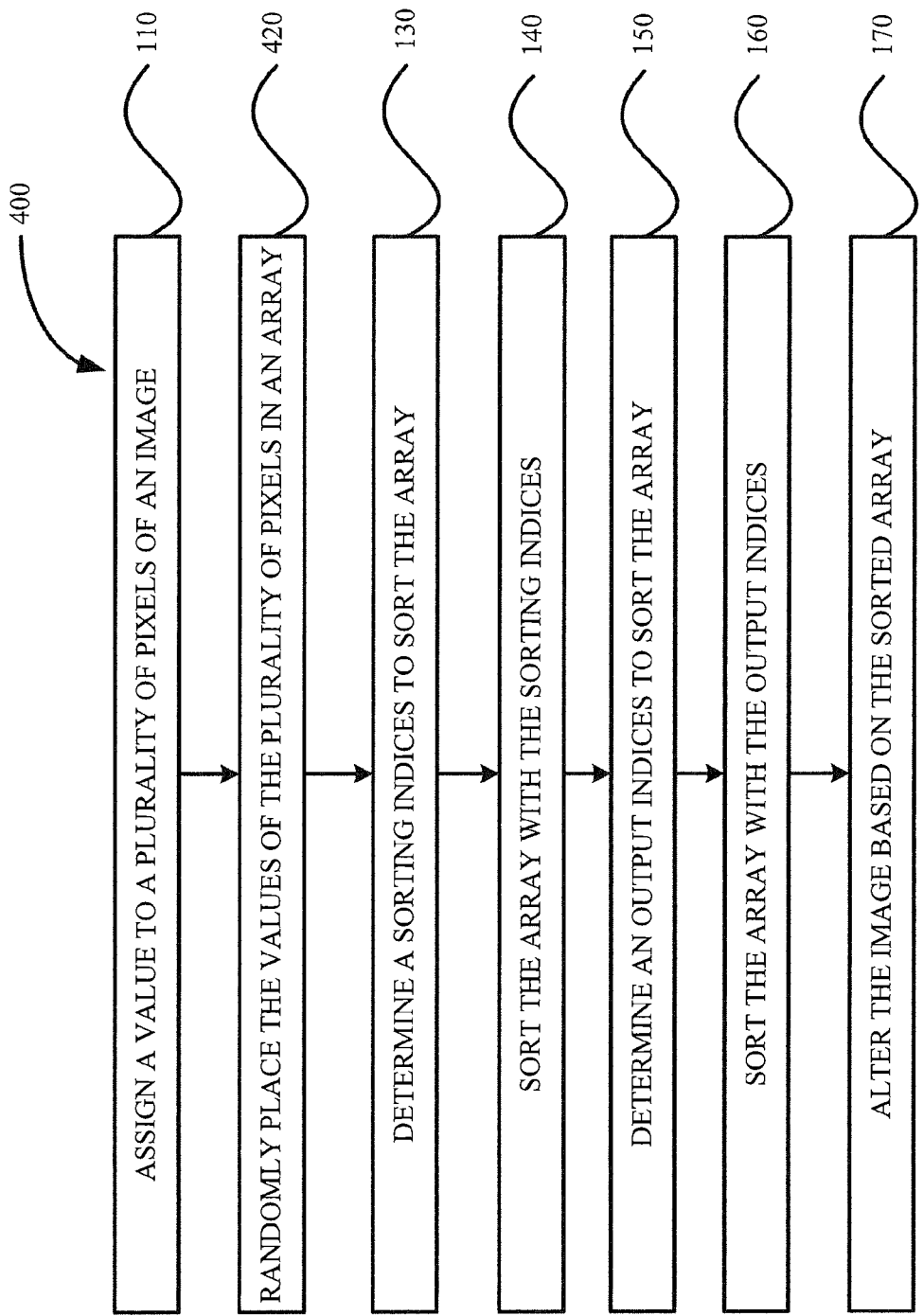
FIG. 4 illustrates a method of processing an image by randomly or arbitrarily placing the values of the plurality of pixels in an array according to various embodiments.

For example, with reference to FIG. 4, ARIS method 400 for processing an image is illustrated. ARIS method 400 may include assigning a value to a plurality of pixels of an image (step 110) and randomly placing the values of the plurality of pixels in an array (step 420). ARIS method 400 also may include determining a sorting indices that would sort the array (step 130), determining an output indices that would sort the sorting indices (step 150), sorting the array with the sorting indices (step 140), sorting the array with the output indices (step 160), and altering the image based on the sorted array (step 170).

Thus, in various embodiments, methods may include encrypting information, decrypting information, or combinations thereof. For example, this may include AIS, ARIS, and AISA processing techniques disclosed herein.

Various ARIS methods may avoid any TON because randomly selected pixels from both rows and columns are used (e.g., from a 2-dimensional array). Thus, to keep track of where pixels originate from, the indices where the pixels were found may be stored separate arrays such that they are returned to their original positions once processed. Of course, the pixels may be returned to an discretionary position, and thus enable another form of encryption.

Moreover, ARIS and various embodiments may include discretionary or random index selection methods if redundancy is encountered. Various ARIS methods disclosed herein may have varying impact on processing efficiency, security, and/or viability of the particular embodiments used. Accordingly, in some embodiments, the sorting algorithms within the scope of this disclosure may self-select the order of sorting through an automated process (e.g., abide by a fixed plan) and/or re-select the order of sorting (e.g., abide by a changing plan). In various embodiments, the sorting algorithms may account for TON based on the geometry of the image and how the information from the image is organized in an array (e.g., based on the number of rows and columns).

Therefore, so as to achieve balancing or altering of AIS-like attributes, various embodiments may include a method to determine that an array that has been AIS, AISA, and/or ARIS processed so as to be of qualifying attributes that meet some criteria, or, so as to assure that the attributes of the array are "AIS-like".

Figure 5:
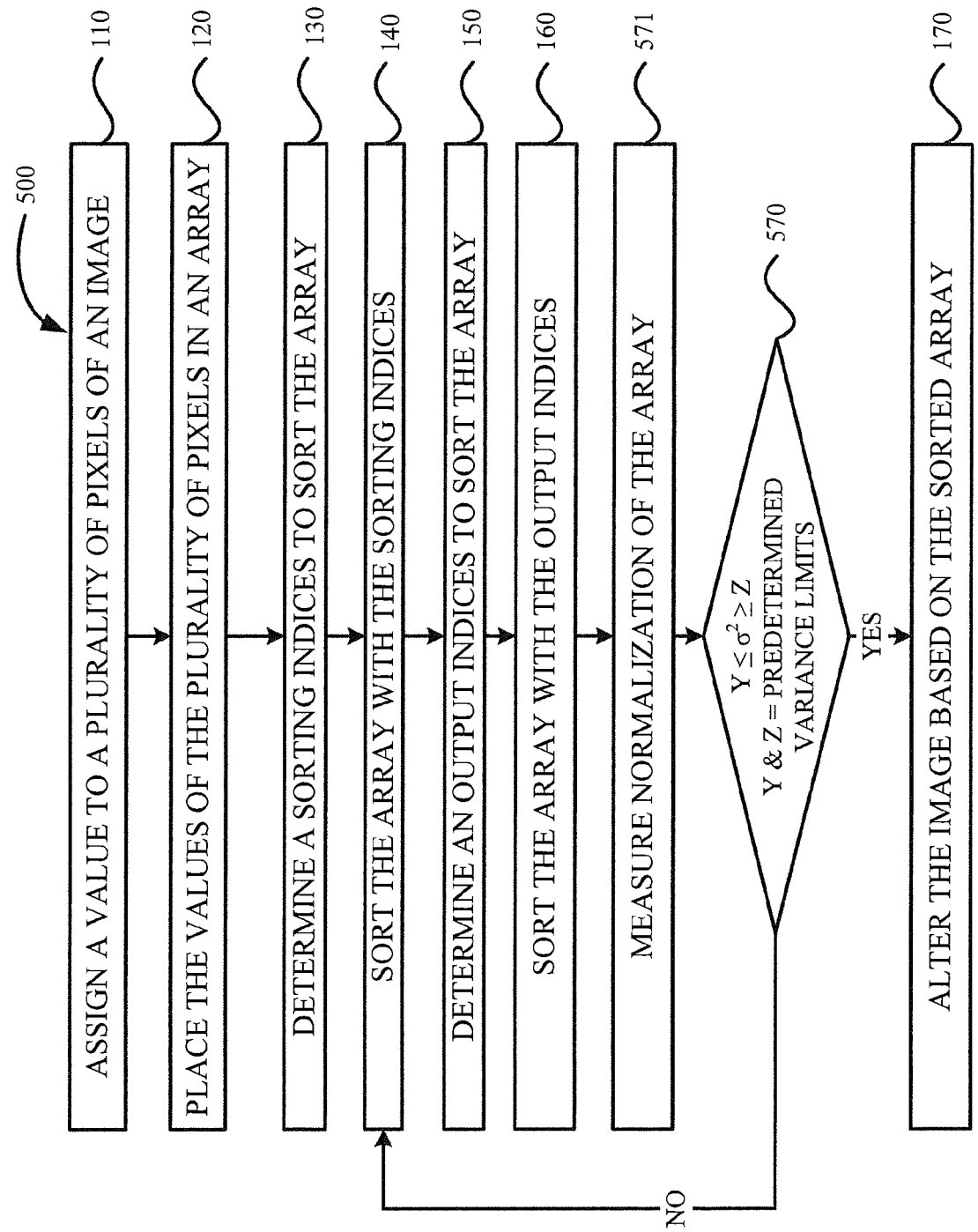
FIG. 5 illustrates a method of processing an image according to various embodiments where a pre-determined criteria, self-adapting criteria, or other algorithm may perform a verification step in recursive loop processing.

FIG. 5 illustrates recursion method 500 for processing an image. Similar to other methods, method 500 may include assigning a value to a plurality of pixels of an image (step 110) and placing the values of the plurality of pixels in an array (step 120). ARIS method 400 also may include determining a sorting indices that would sort the array (step 130), determining an output indices that would sort the sorting indices (step 150), sorting the array with the sorting indices (step 140), sorting the array with the output indices (step 160), and altering the image based on the sorted array (step 170). Recursion method 500 may also include determining whether the variance of the array is within a predetermined limit (step 570), for example, after measuring the normalization of the array (step 571).

An example purpose of this FIG. 5 method may be to balance or trade-off between AIS-like attributes such as between the amount of Type One Noise ("TON") and Type Two Noise ("TTN"). For example, the ARIS method and its variations may be used to eliminate this TON noise as shown in FIG. 4 and FIG. 5, but perhaps increase TTN. To achieve adequate histogram improvement and AIS-like effect (by selecting a sufficient number of pixels), the process may be used in conjunction with a recursion loop method as exemplified in FIG. 2, FIG. 3, FIG. 4, and/or FIG. 5 and various embodiments disclosed herein.

Another example of the method as shown in FIG. 5 is a hybridization of the AISA process as was originally described above and shown in FIG. 2 (and so, including steps 180, 190, and 195), where, instead of utilizing, for example, fixed methods and/or fixed ordering of methods, these become discretionary and/or random. For example, the input array and the algorithm to rank the array may be such that number of sorting events needed to produce a quasi-unique array is increased or decreased from the usual four events per recursion loop, even down to no sorting events (for example, once a quasi-unique array has been discovered, it may easily be copied and pasted into a new array via step 110, thereby omitting all other steps). Or, methods may be configured arbitrarily to such an extent that both TON and TTN are mitigated at the same time. However, these adaptations may lose other AIS-like attributes. For example, though a quasi-unique array may have been produced via a FIG. 5 method or variation therein, the method that produced it may not necessarily be of limited utility or not useful for mass-production. In other words, the FIG. 5 method could only useful for one particular input array or perhaps a limited set of a certain type of input arrays, whereas the FIG. 2 process may reliably convert any given array from non-AISA to AISA. Though, this is not to say that hybrid and/or mixed methods are not useful, as they may produce a useful balance of AIS-like attributes or even create new AIS-like attributes.

Herein are shown examples of AIS, ARIS, and AISA processing, and in several cases various benefits are highlighted, how various limitations may be reduced, and to aid in selection of various methods in various situations.

In all cases, except as indicated, frames were acquired with a Canon EOS 60D camera in 14-bit per channel raw mode, where the dynamic range was automatically stretched to 16-bits when saved to RAW format. Then, the images were cropped from size 5184×3456 column by row pixels down to 3456×3456 pixels. Then, each image had its color components split into individual two-dimensional arrays of 3456×3456 pixels. AIS processing occurred in PYTHON or MATLAB in 16-bit and/or 32-bit space. Except as indicated, all images were compressed down to 8-bits by bit shifting for presentation purposes.

To better illustrate the various methods and systems disclosed herein, several cases were studied that ranged from computer generated images to photographs. FIGS. 6A-D, the input images were, in one case, binary with two values of black and white (FIG. 6A), and in another case a randomized zero mean intensity background with a constant intensity box overlaid (FIG. 6C). In the binary case, AIS processing examples disclosed herein produced a noticeable blocky pattern that extends along the single sort axis (FIG. 6B); this type of pattern and similar may be referred to as "Type One Noise" or "TON". FIG. 6D illustrates a 1-axis AIS sort of the image in FIG. 6C.

Figure 7B:
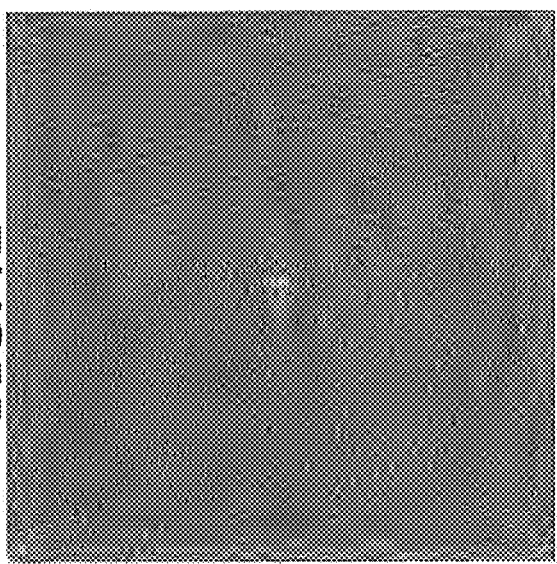
FIGS. 7A-D illustrate a random zero mean background image and the zero mean background image processed according to various embodiments.
Figure 7D:
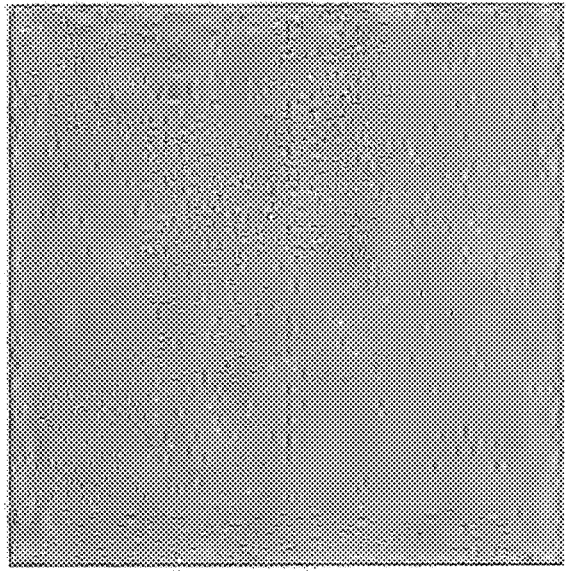
Figure 7A:
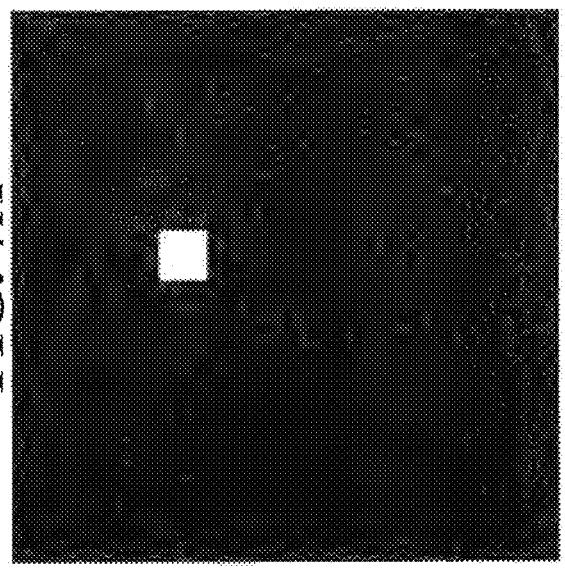
Figure 7C:
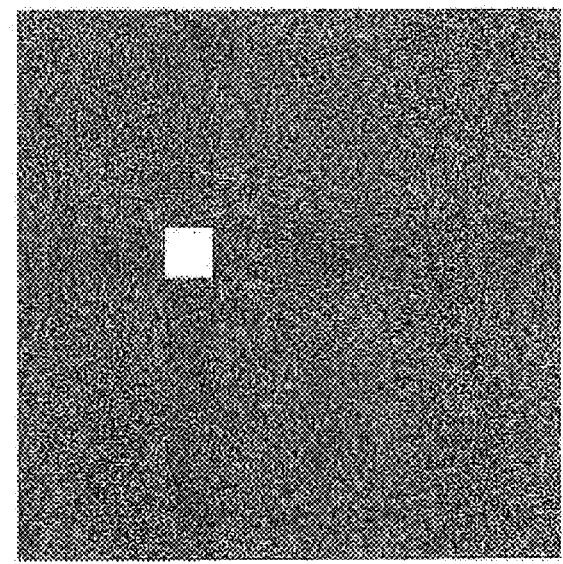

FIGS. 7A-D includes a case where both a row (FIG. 7B) and column (FIG. 7C) were index sorted. Using a Fast Fourier Transform of the sorted array, FIG. 7D illustrates that the AIS methods may sufficiently suppresses the DC component of the source image.

Figure 6B:
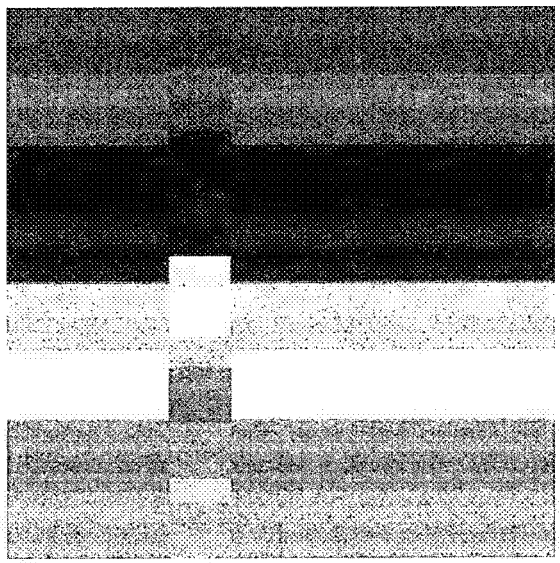
FIGS. 6A-D illustrate binary and grayscale images before and after processing according to various embodiments.
Figure 6D:
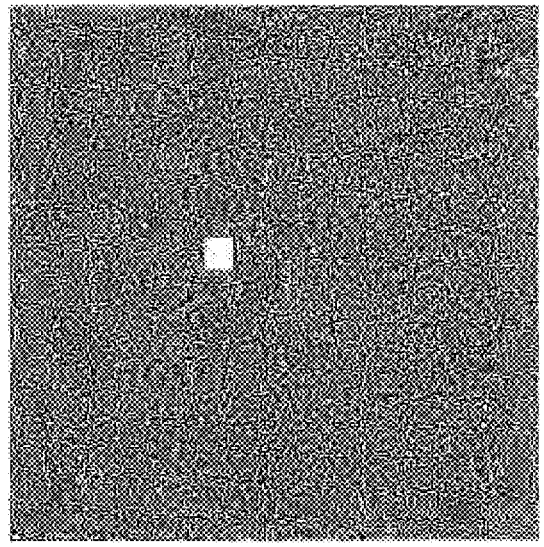
Figure 6A:
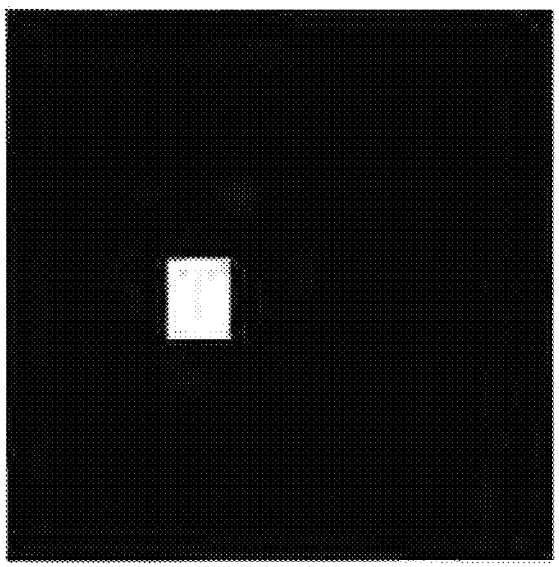
Figure 6C:
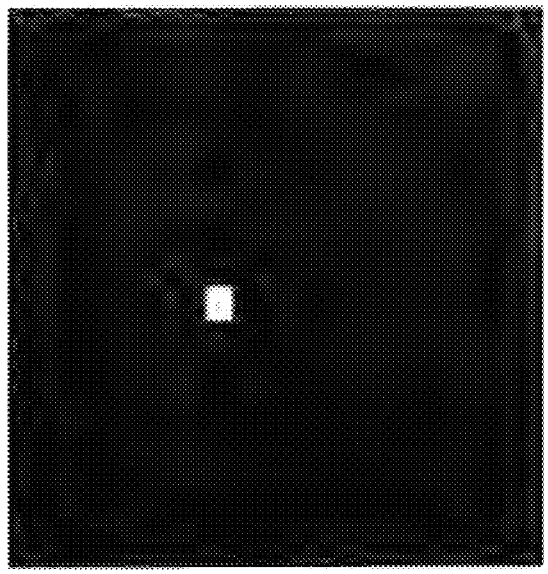

Returning to the discussion of the randomized background case from FIG. 6C, the blocky pattern is markedly reduced in FIG. 6D when compared to FIG. 6B. Thus, in some embodiments, variations in pixel values in the input array, and/or variation in the array itself may lend itself better to produce less TON. This implies that an input image that would otherwise produce heavy TON may have its contents altered by values or indices before AIS processing, so as to produce less TON.

Figures 8A, 8B:
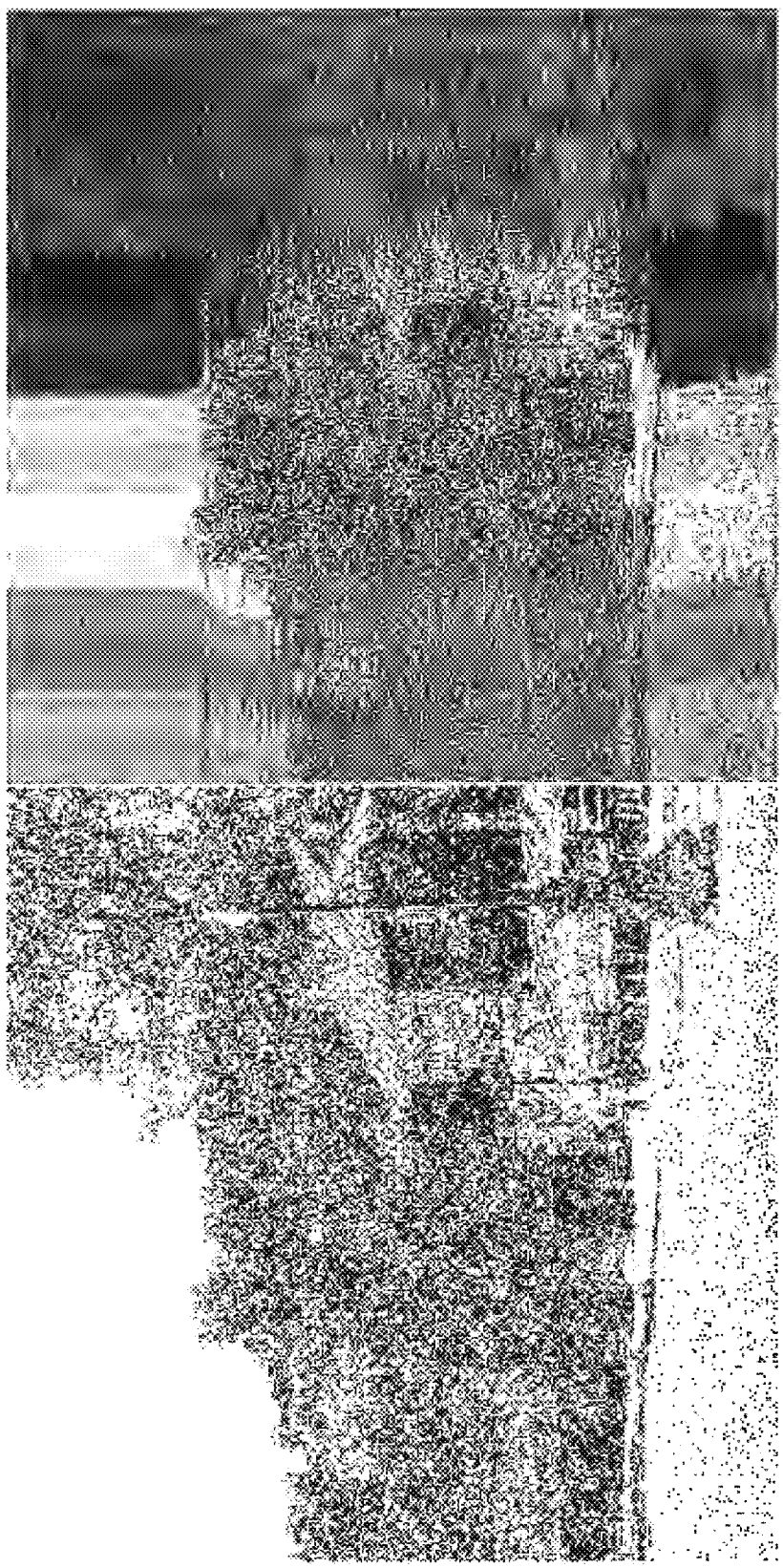
FIGS. 8A and 8B illustrate a pixel thresholded binary image and its column AIS according to various embodiments.

With reference to FIGS. 8A and 8B, FIG. 8A was acquired with the Canon camera and then custom thresholded to binary format. When processed with a column AIS method, FIG. 8B illustrates the presence of TON.

Without being limited to any theory, it may also alternatively be understood that TON may increase as uniqueness of intensity values in a given sort axis decreases. In other words, when pixel values are absent in the input image or are redundant (multiple instances of the same value occur throughout the array), this may produce increased TON when AIS processed. However, many images are not limited merely to binary dynamic range in the input image and, thus, the scene itself can be rather randomized intensity with many different intensity values with less redundancy.

Further, camera settings, especially gain, affect pixel to pixel variation. Consider, for example, if the image from FIG. 8A were printed and then photographed, and then AIS processed.

Figure 9A:
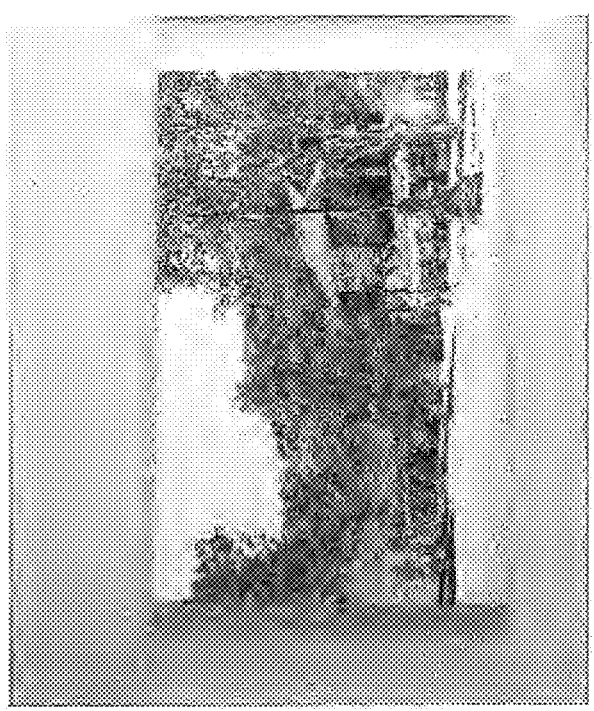
FIGS. 9A-C illustrate 16-bit per channel RGB image converted to an 8-bits per channel image and the image after AIS processing according to various embodiments.
Figure 9B:
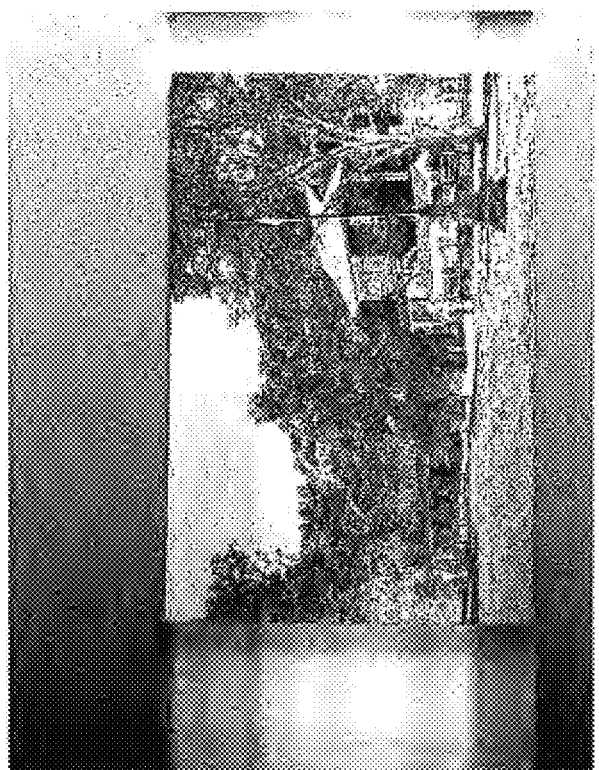
Figure 9C:
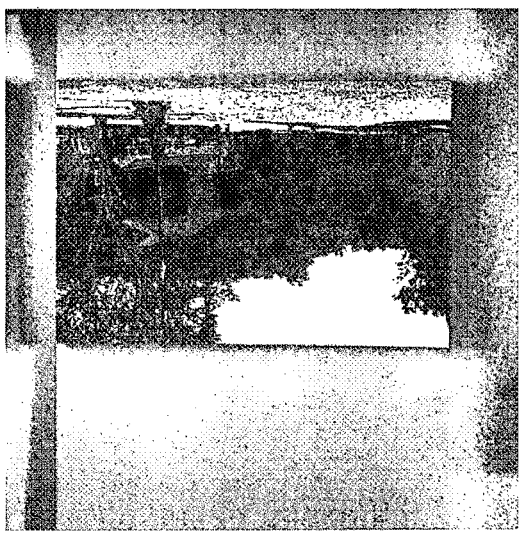

As seen in the resulting FIG. 9A-C the TON within the picture frame is less noticeable. Note that the input orientation image and/or sorting axis does matter for AIS processing in FIG. 9C. In FIG. 9A, the original image is shown on the left before AIS processing. Then, the image was AIS processed with the same horizontal orientation and sorted by column (shown in FIG. 9B), such that the image was sorted into ascending order from left to right at step B, then sorted again at step C. As can be seen, there was heavy TON to the left, right, and inside the picture frame. Then, the original image was rotated counter-clockwise by 90 degrees to vertical, and then AIS processed in the same axis (e.g., by column) and note that the TON was still to the left and right of the now rotated picture frame edge such that accurate intensity values can be obtained below the picture frame, of which was formerly its West side (shown in FIG. 9C).

Figure 10G:
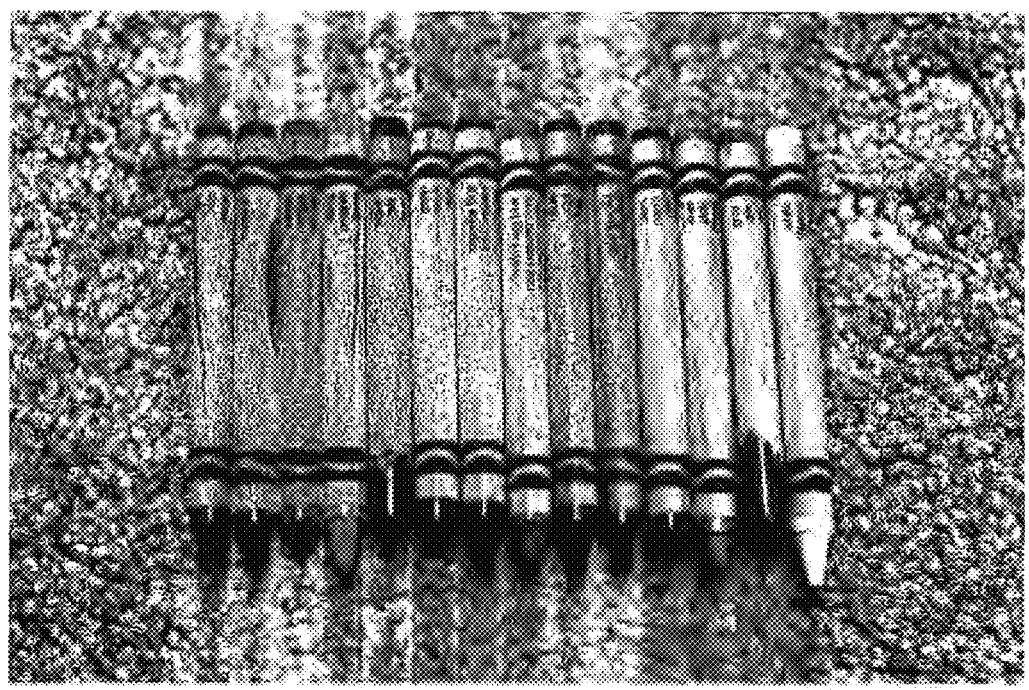
Figure 10H:

In FIGS. 10A-10H, the image orientation was kept constant and sorting was varied by column and rows, and where cropping the input image did not occur. Several levels of exposure were acquired, and the color channels were made composited after AIS processing. The background in the scene was standard house carpet, so as to increase intensity variation surrounding the subject matter (CRAYOLA crayons) that have been organized so as to emphasize TON. With the column sort AIS, the color balance has improved (as shown in FIGS. 10D-10F) in vibrancy and contrast, and, it is easier after processing to distinguish which crayon wrapper is green and which is yellow. For example, it was a surprising and unexpected result how the blue crayon, which appeared to be purple before processing, was remarkably blue after processing. The streak lines to the left and right of the crayons is TON. The quantitative color values of the crayons and TON were arbitrarily selected and are reported in FIG. 10I. Although the carpet did have some effect, the column sort case AIS algorithm calculated a more accurate color, despite that input image had an initial incorrect white balance.

Then in FIG. 10G, the properly exposed image from FIG. 10B was sorted by row, and now the TON noise can be seen extending above and below, where the subject matter still maintained proper color balance; though noisier. The ARIS case FIG. 10H, was achieved by randomly selecting the indices of the image in chunks of 65536 pixels at a time, processed in the AIS (ABC) method, returned to their original indices, and the output of that was input back into step A recursively X=250 times. Gaussian blur and bilateral filtering were then performed to mitigate TTN. After ARIS, no TON noise is evident, and color balance was still improved, though still having some flaws. Also, the contrast was of different quality than given by AIS as because of increased TTN noise, of which may be mitigated by frame averaging.

Figure 11A:
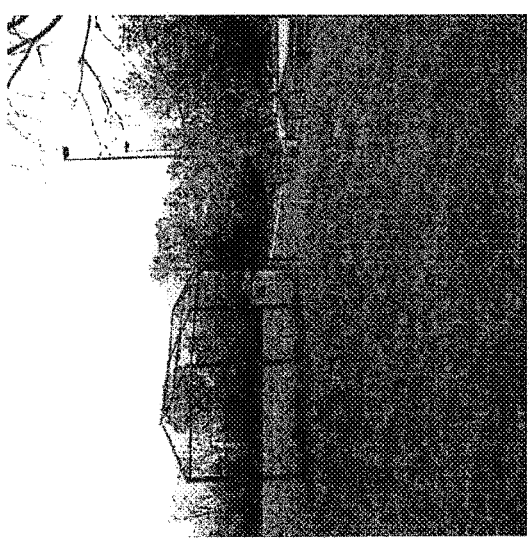
FIGS. 11A-C illustrate an RGB image and the RGB image after processing with AIS and ARIS sorting techniques according to various embodiments.

Now that AIS and ARIS have been fairly well characterized, the following illustrates real world applications, such as general photography. In FIG. 11A and FIG. 12A, images were acquired in an outdoor scene without saturating the camera. In FIG. 11A, the scene consisted primarily of densely packed small objects with highly variable intensity, but contained two large, consistent intensity objects: sky and grass.

Figure 11B:
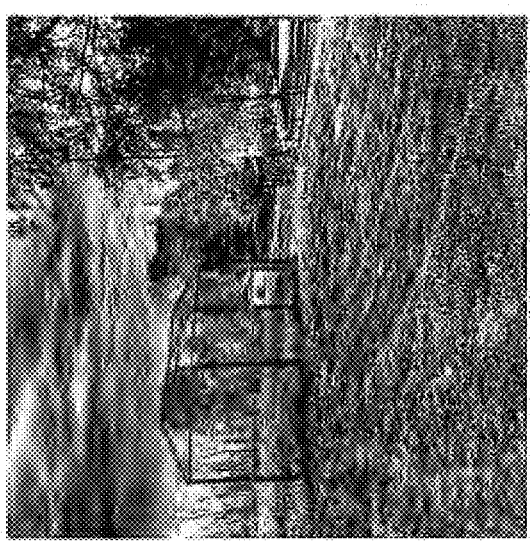

After AIS processing and as shown in FIG. 11B, the sky was darkened and color balance everywhere is noticeably different to include magenta, but now the clouds and mow lines in the grass are easily seen, as since contrast everywhere increased. The ARIS case (shown in FIG. 11C) provided a half-way point in contrast improvement.

Figure 11C:
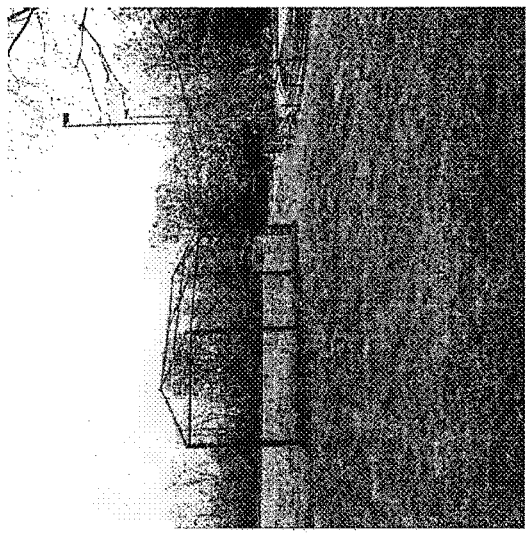
Figure 11D:
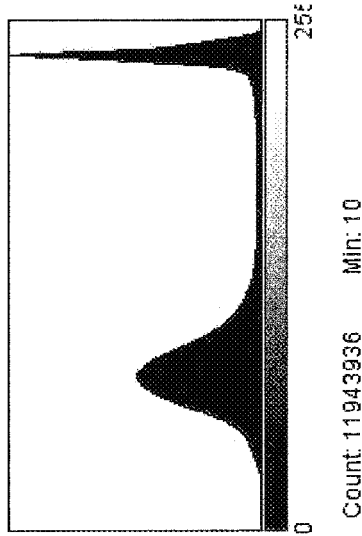
FIGS. 11D-F illustrate the histograms of the RGB images in FIGS. 11A-C.
Figure 11E:
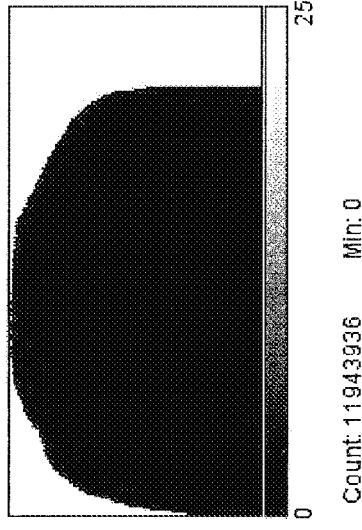
Figure 11F:
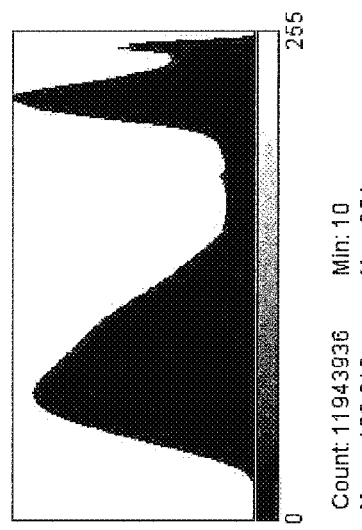

FIGS. 11D-11F shows the histogram of all channels from the before and after AIS processing of FIGS. 11A-C respectively, and note that both images were acquired/processed in 16 bits and then compressed to 8 bits. Prior to processing, the histogram consisted of two distinct peaks where the foreground grass maps to the lower intensity Gaussian curve and the background sky maps to the sharp, high intensity peak.

After AIS processing, the histogram is nearly flat, or uniform. A moderate amount of bright, speckled pixels are also evident in the sky after AIS processing, which may be referred to as Type Two Noise ("TTN") herein. Despite this, the various benefits of a more flat histogram in various embodiments is made plain in the middle image, where both the human eye and computer algorithms can now more easily recognize features in the image.

Next, FIGS. 12A-C show a scene with large objects, but which contain an adequate amount of intensity variation to limit Type One Noise (TON) noise to a slight amount at about 3 o'clock. FIG. 12 A is the original, while FIG. 12B is processed with AIS processing, and FIG. 12C is processed with ARIS processing, and FIGS. 12D-F show the respective histograms of FIGS. 12A-C.

The histogram prior to processing FIG. 12A was fairly Gaussian to start out with, and, after AIS processing, it became nearly flat or uniform across all values. Accordingly, in some embodiments, AIS can produce images with low TON and with only a single frame. Here, the maximum intensity value after AIS was 215 because the least number of pixel axis contained 3456 pixels, and, after AIS, was immediately bit-shifted down 4 bits, where, 0 also counted as a viable intensity value. As can be seen, the color balance improved after AIS and ARIS processing.

Figure 13A:
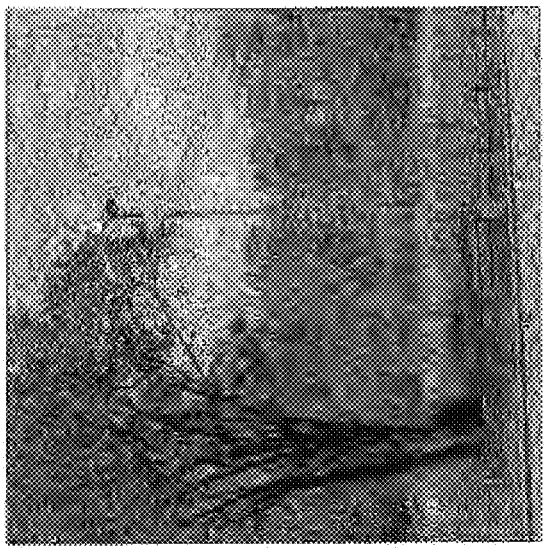
FIGS. 13A-C illustrate a low exposure RGB image and the low exposure RGB image after processing with AIS and ARIS sorting techniques according to various embodiments.
Figure 13B:
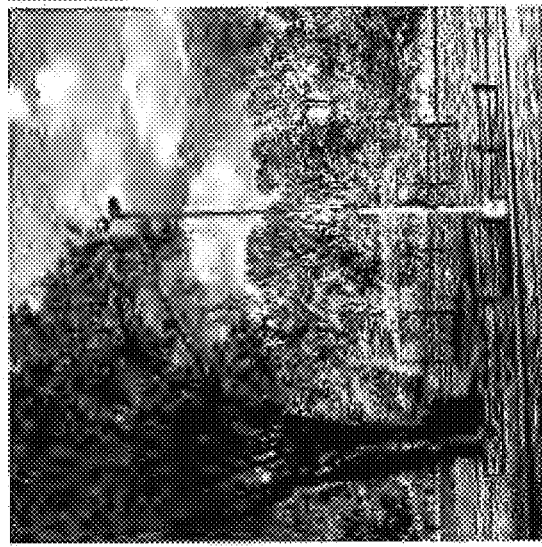
Figure 13C:
Figure 13D:
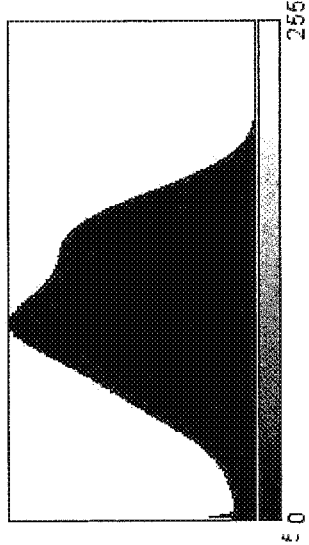
FIGS. 13D-F illustrate the histograms of the low exposure RGB images in FIGS. 13A-C.
Figure 13E:
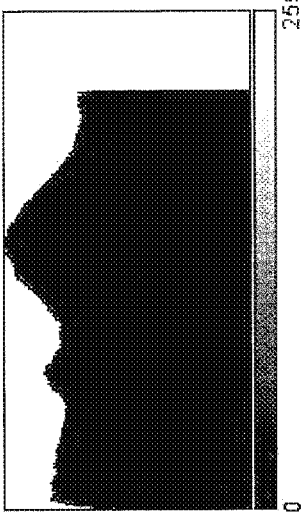
Figure 13F:
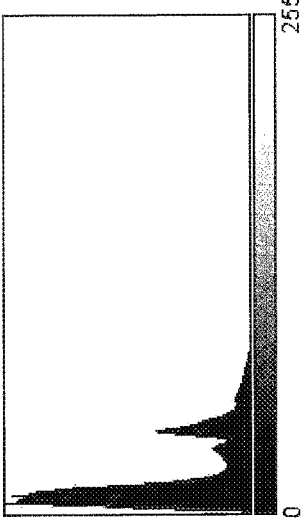

Moreover, various methods may be able to up-convert or stretch a low dynamic range to a high dynamic range. In some cases and/or embodiments, the input image maximum intensity level may be less than the number of pixels in a given sort axis and the entire scene may be expanded in dynamic range up to the number of pixels, but conversion noise, particularly TTN, may result. Although this TTN can be reduced with frame averaging of AIS frames, AIS may favor a full dynamic range in the input image. Consider, for example, FIGS. 13A-C, which started with an under filled exposure image. Dark objects such as the fence line are more readily seen after AIS processing (shown in FIG. 13B) and ARIS processing (as shown in FIG. 13C), but more noise may be seen in the sky due to TTN. FIGS. 13D-F illustrate the histograms of FIGS. 13A-C respectively.

Figure 14C:
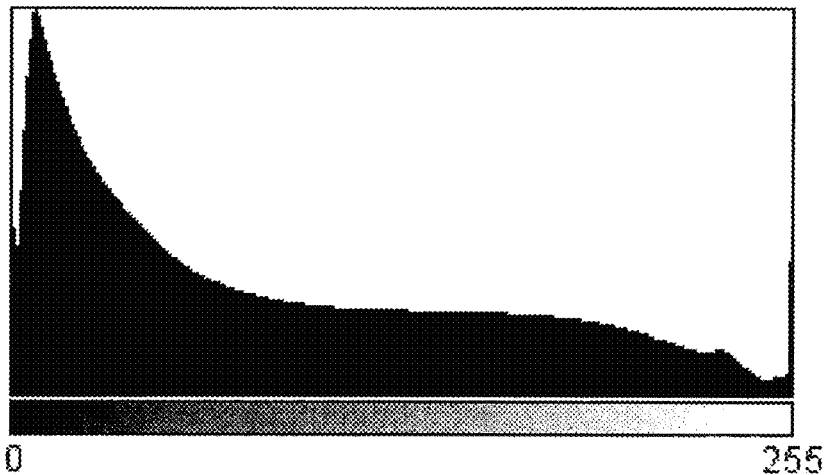
FIGS. 14C-D illustrate the histograms of the images of the Andromeda galaxy illustrated in FIGS. 14A-B.
Figure 14D:
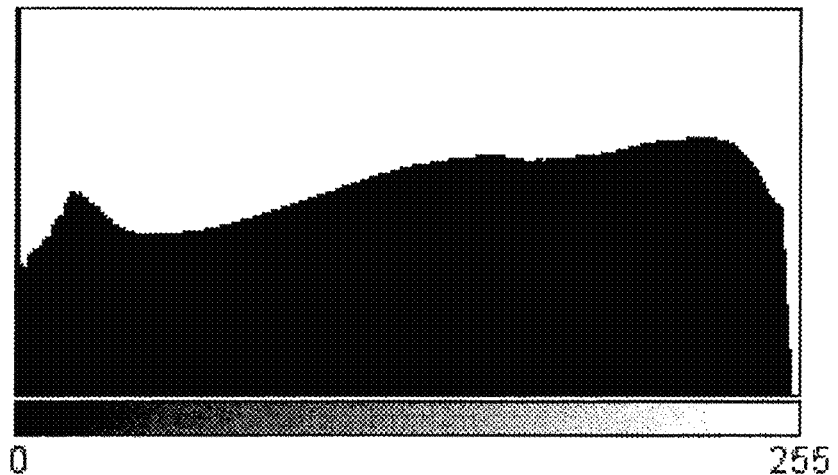

FIG. 14A is an image where the source image was 8-bits, but which had 40,000 pixels on its longest axis and was sorted in single pass along that axis (shown in FIG. 14B). The histograms of FIGS. 14A and 14B are shown in FIGS. 14C and 14D respectively.

Figure 15A:
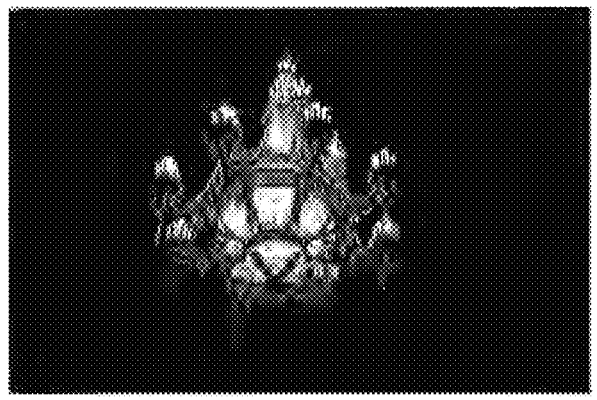
FIGS. 15A-E illustrate an RGB image, processed images of each channel of the RGB image, and combinations of the channels according to various embodiments.
Figure 15F:
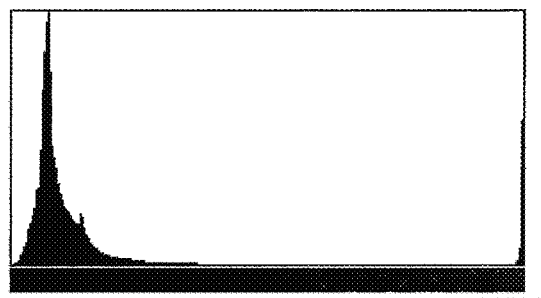
FIGS. 15F-J illustrate the histograms of the images depicted in FIGS. 15A-E respectively.
Figure 15B:
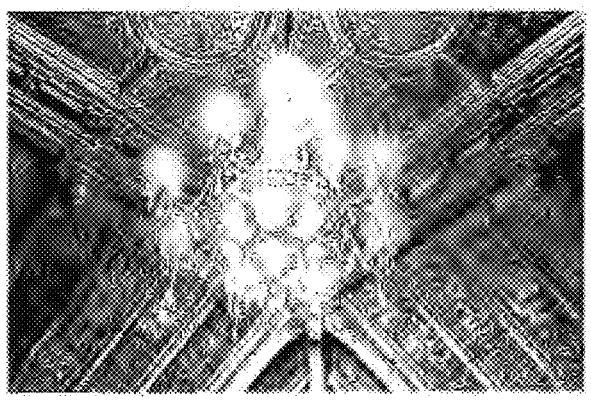
Figure 15G:
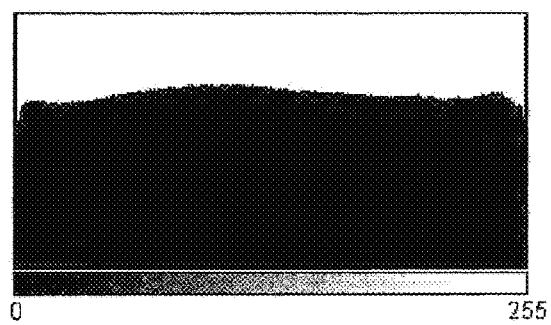
Figure 15C:
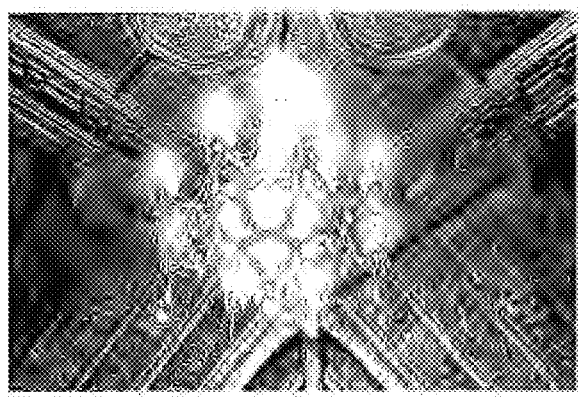
Figure 15H:
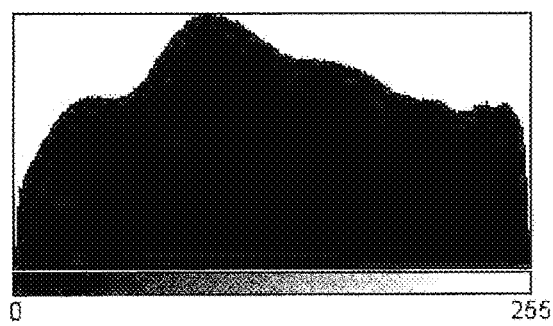
Figure 15I:
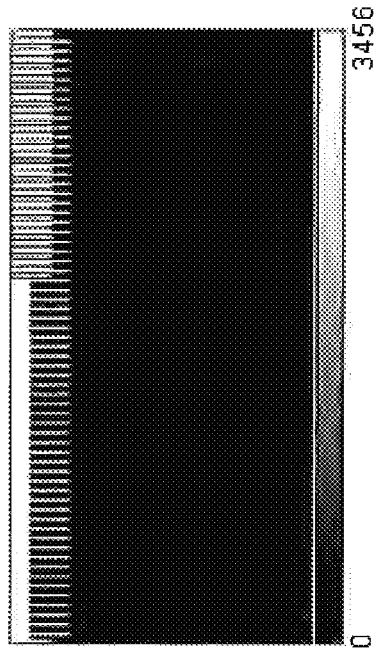
Figure 15J:
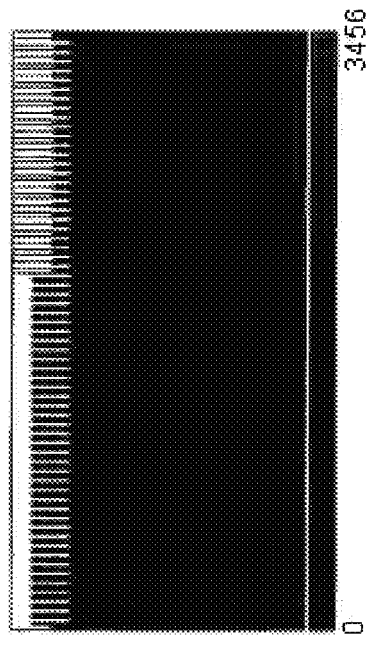
Figure 15D:
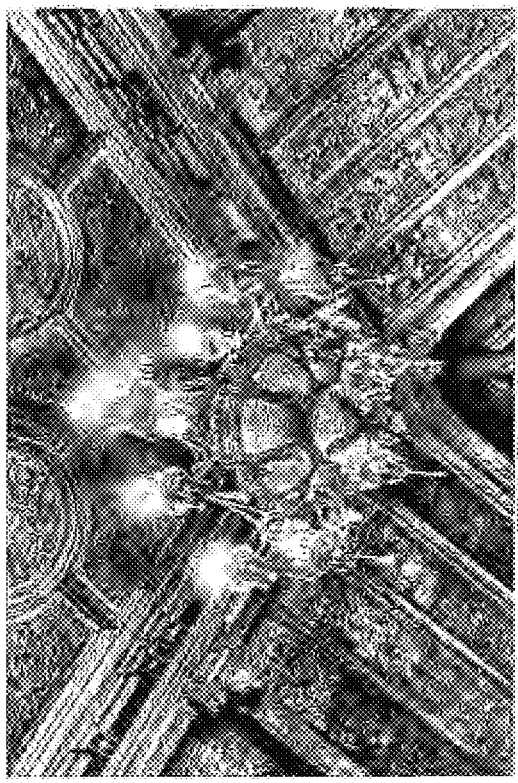
Figure 15E:
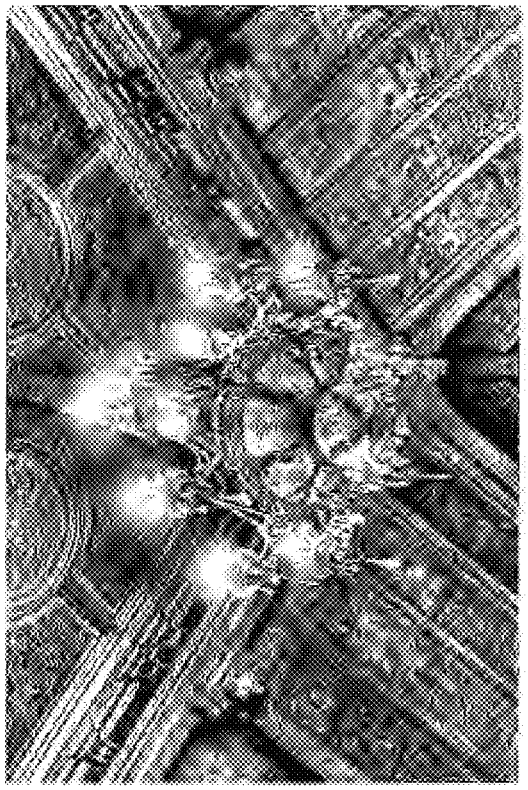

Regarding AISA, FIGS. 15B-E were produced by 2-pass sorting by column then row in a recursion loop processing of FIG. 15A. The images as indicated in FIGS. 15A-E are Array Index Sorted Authentic (AISA) because no additional 2-pass sorting resulted in different pixel values. Here each channel of these images was processed with AISA, but in some embodiments, merging the channels into a grayscale image or otherwise "stacking to RGB," may result in the resulting image may no longer be AISA, unless for example, made so by more recursive AIS processing. First, in FIGS. 15B and 15C, the results are shown after a single set of a 2-pass column first sort (and not yet AISA). Then in FIGS. 15D and 15E, the AISA images are shown. FIGS. 15F-J show the histograms of FIGS. 15A-E respectively.

Figure 16A:
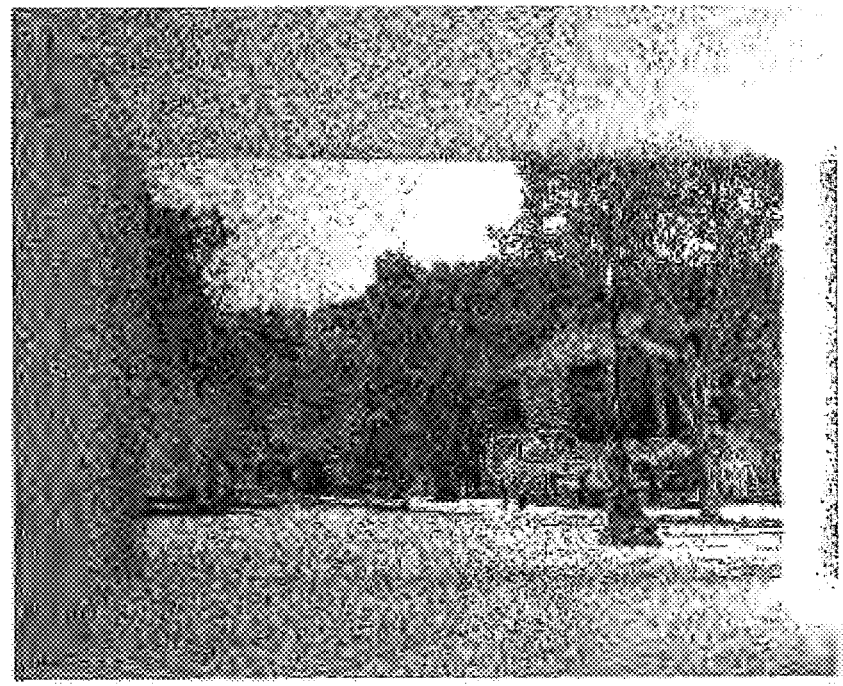
FIGS. 16A and 16B illustrate a green channel processed ARIS image and its histogram according to various embodiments.
Figure 16B:
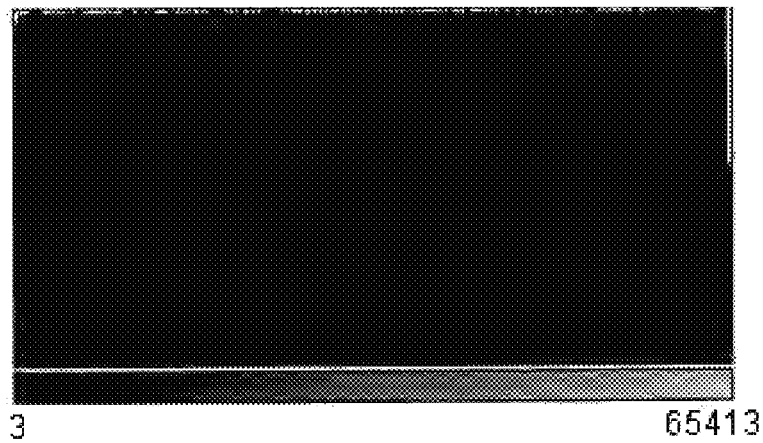

FIG. 16 A illustrates a green channel ARIS image, and FIG. 16B illustrates the respective flat histogram that was achieved by a recursive ARIS process, yet no TON is evident. The original image was the same as FIG. 9A, which was cropped after ARIS processing, but other than cropping, this image was not altered in any way after ARIS processing (step 170 was omitted) so as to maximize the histogram uniformity. The larger ARIS processed image from which FIG. 16 A was cropped also had the characteristic uniform histogram.

The original image that produced FIG. 16A via ARIS was the FIG. 9A, of which was previously shown as AIS processed in FIGS. 9B and 9C.

Finally, another application of AIS processing is image forensics—particularly the revealing of scene lighting origin and object recognition. In these next images, the number of clues in the original image varies.

Figure 17A:
FIGS. 17A and 17B illustrate a image with shadow and light blots and the image processed with AIS methods according to various embodiments.
Figure 17B:

For example, any of the following clues may be evident: the shadows on the ground, blots of light as caused by the camera shutter aperture, and even shadows on the objects in the scene, as in FIG. 17A. This evidence may be conflicting, such as when hill gradients are involved, and in other cases, little evidence may be found. After AIS processing, the TON in particular readily reveals the vector of light on the scene, which can be useful for estimating time of day, which object are closest to the camera, and the elevation and gradient of hills in the scene, and so on, as can be seen in FIG. 17B.

Figure 18A:
FIGS. 18A and 18B illustrate an outdoor image and the outdoor image processed with AIS column sorting according to various embodiments.
Figure 18B:

FIG. 18A illustrates another outdoor image where the vector of light on the scene is difficult to ascertain and where processing the image with AIS column sorting (as shown in FIG. 18B) reveals the vector of light according to various embodiments.

Figure 19A:
FIGS. 19A and 19B illustrate an image and the image processed with AIS column processing according to various embodiments.
Figure 19B:

Moreover, as yet another example, FIG. 19B illustrates that after AIS processing, the lighting origin upon clouds become less ambiguous as compared to the original FIG. 19A.

Figure 20A:
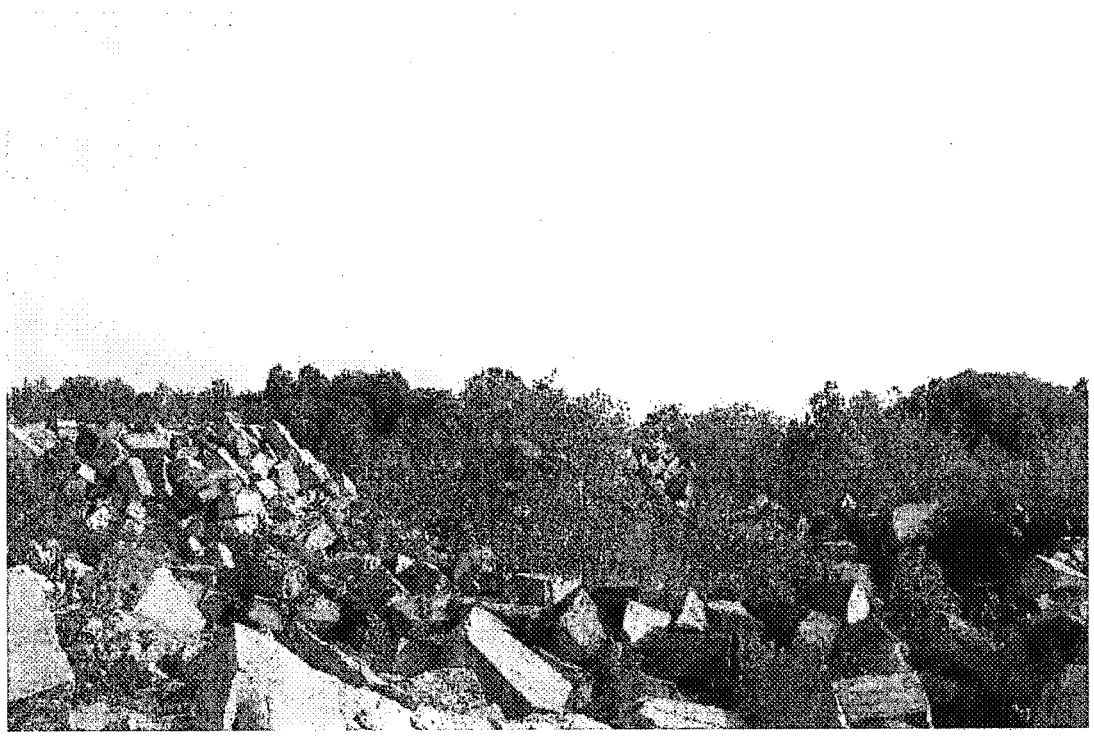
FIGS. 20A and 20B illustrate an image where the scene lighting is ambiguous and the image after AIS processing according to various embodiments.
Figure 20B:

In FIG. 20B, Type One Noise streak lines are not present but instead the shadow lines cast from clouds are revealed by AIS contrast improvement of FIG. 20A, of which otherwise may be a challenging phenomenon to capture on camera.

Given these results, the AIS, AISA, and ARIS methods disclosed herein can produce images of increased contrast, even if two distinctly different intensity value objects are in the scene.

Whenever "another array" or "a new array" is stated, this could also mean that an existing array is modified or otherwise merged with itself or another existing array without the need for creating or storing a new array.

The term "array" may be interchangeable with the term "image". Also the term "pixel" may be interchangeable with "element."

The acronyms and terms AIS, AISA, ARIS, TON, TTN, mixture, hybrid, and other terms are intended as descriptive qualifiers whose definitions may not necessarily abide by heretofore known theory and may not necessarily embody the entire scope of possible methods and variations based on themes they describe, but are nevertheless intended to broadly categorize, in some way, methods and/or array characteristics by class. The following are methods guidelines that may distinguish each class.

Generally, AIS can be understood to include methods that include at least one pair of sorting steps (sorting with the sorting indices and sorting with the output indices), such that both AISA and ARIS may include AIS.

AISA can be understood to include methods that include at least two pairs of sorting steps (sorting with the sorting indices and sorting with the output indices—twice), which contains a change in method (especially pixel selection) in between pairs, and which contains recursion.

Thus, in various embodiments, methods may include determining a second sorting indices to sort the array, determining a second output indices to sort the sorting indices;, sorting the array with the second sorting indices, and sorting the array with the second output indices. Also, in various embodiments, the sorting indices and the second sorting indices may be different.

Also, in various embodiments, the sorting indices may discretionarily sort the array and is not particularly limited. For example, in various embodiments, the sorting indices may sort the array along a diagonal of the array, a chord of the array, or combinations thereof. As used herein, a "diagonal" of the array may be understood to include a line that segment connecting two non-adjacent vertices of a polygon and a "chord" of the array may be understood to include a line segment joining two points on any curve or polygon.

Figure 21B:
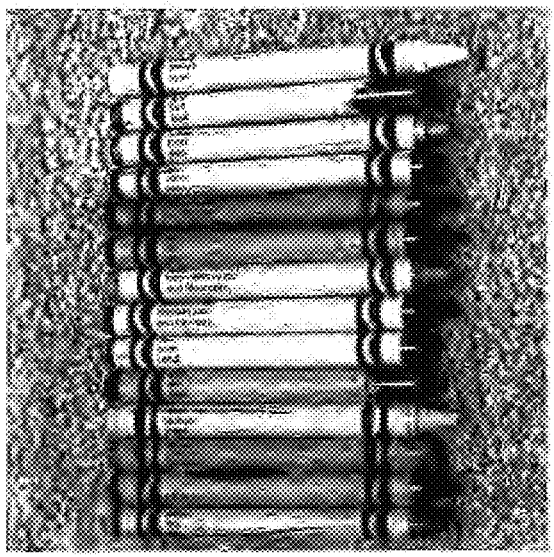
FIGS. 21A-E illustrate the image of FIG. 21F processed with array chord index sorting methods according to various embodiments.
Figure 21D:
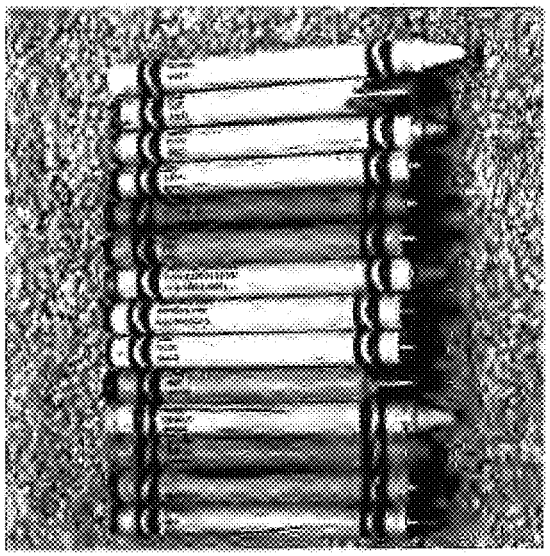
Figure 21A:
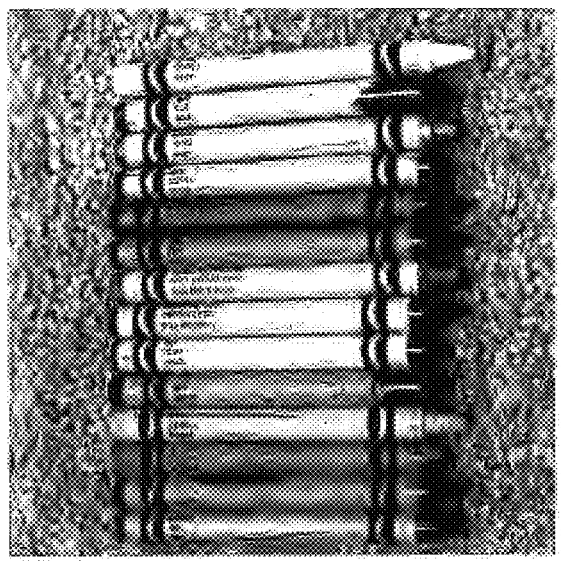
Figure 21C:
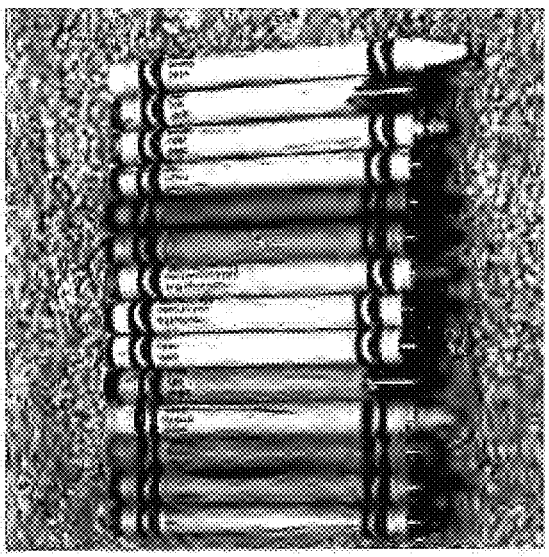
Figure 21F:
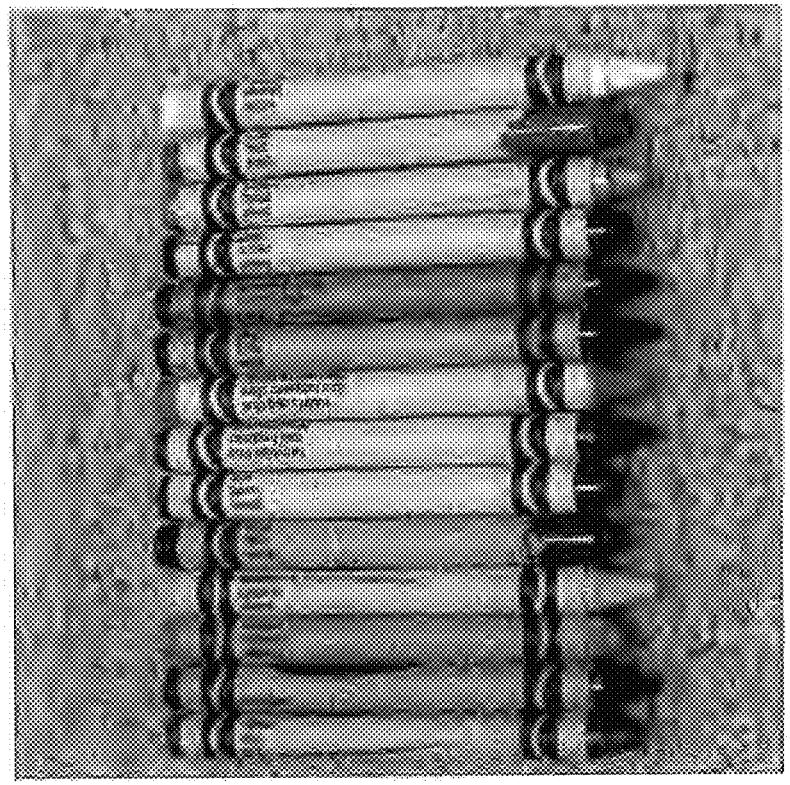
Figure 21E:
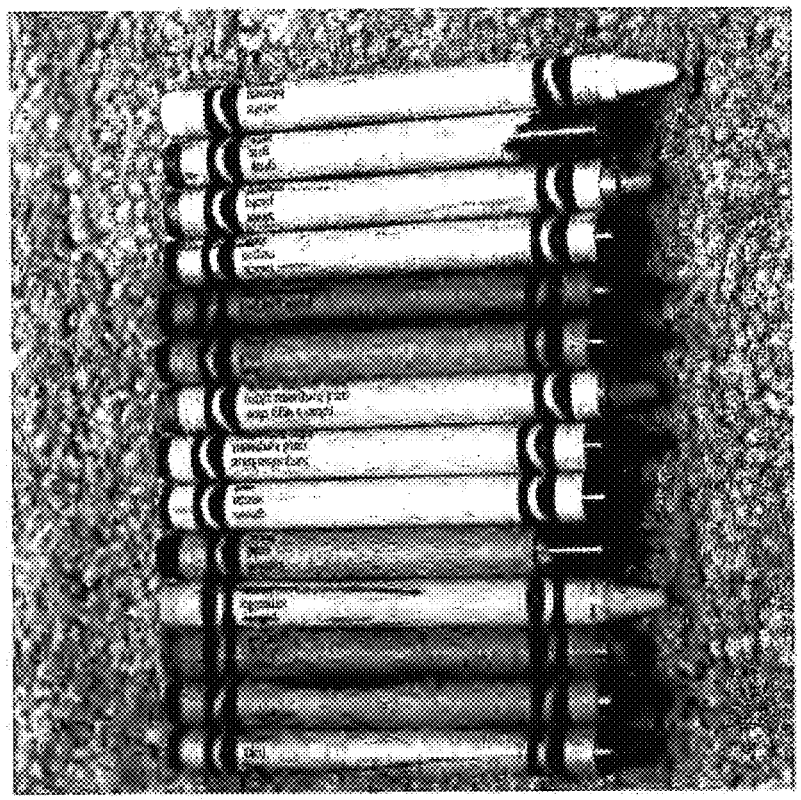

For example, FIGS. 21A-21E illustrate the results of processing the photo illustrated in FIG. 21F with various Array Chord Index Sorting ("ACIS") methods. FIG. 21A illustrates an image processed with circular row shift, FIG. 21B illustrates and image processed with ACIS with a circular column shift, FIG. 21C. illustrates ACIS flipped circular row shift, FIG. 21D illustrates ACIS with flipped circular column shift, and FIG. 21E illustrates the average of FIGS. 21A-21D for an ACIS4 image.

These FIGS. 21A-21E results are quite similar to various ACIS embodiments where two chords of selected data were assembled, AIS processed, and then returned, and where: many such chord pairs were selected so as to gather data from the entire array, each pixel was only selected once, the array diagonal was also used, and where flipping and/or rotating the array enabled four different variations of this theme so as to produce an ACIS4 image result that was very similar to FIG. 21E. A significant difference in results was that the chord method processed significantly faster than other various circular shifting methods.

ARIS can be understood to include methods that include at least one pair of sorting steps, that the pixel selection method is randomized or arbitrarily performed, and which may optionally contain recursion. TON is intended to mean a blocky pattern where a row or column of pixels tends to be a noticeably different than adjacent rows or columns by a similar-looking amount. The TON pattern depends on the input array, and so TON will likely not be identical to as depicted in the various figures—hence the term noise. TTN is intended to mean a speckle pattern where individual pixels are far brighter or dimmer than their adjacent neighbor pixels, and this speckle pattern appears to be randomly distributed throughout the array. Mixture or hybrid is intended to mean the combination, variation, merging, and/ or omission of methods between the three main AIS, AISA, and/or ARIS classes of methods. Such hybrid or mixture methods may allow for other method variations such as reducing a given pair of sorting steps to become a single sorting step.

The terms "row" and "column" refer to array organization or structure and so refer also to indices. Note that an array may not necessarily be organized in rows in columns, yet the terms row and columns are intended to refer to however the data may be organized.

The term "value" is generally intended to be a shortened description of the actual data that is stored in an array where the data could be numeric, alphabetic, symbolic, and so on. The term "index" or the plural "indices" is generally intended to be a shortened description of the way in which said data is referenced, and so indices may also have values.

The term quasi-unique array is intended to mean an array of different characteristic than a unique array, "magic" array, or Sudoku array. A unique array, or magic array, is a state where each array element is different from the other elements. This type of array is considered to be non-AISA and may become AISA. The Sudoku array, however, is an array where any given pixel element is unique among both its row and column neighbors. Yet further, an AISA array is of looser restriction that specifies that uniqueness may need only be found in a given row or column and not necessarily both—but may indeed include uniqueness in both. Hence the phrasing "quasi-unique", and thus an AISA array may not necessarily be a Sudoku array, but a Sudoku array can be verified as AISA. Both the Sudoku array and the quasi-unique AISA array contain redundant values throughout the array. Hence, a magic or unique array may become a Sudoku array via AISA processing, but AISA processing may not necessarily solve (fill in empty elements of) a Sudoku puzzle so as to make a completed Sudoku array. In summary, it may be understood that in terms of uniqueness strictness, the spectrum goes from AISA being the least strict, to Sudoku being moderately strict, and then to the magic array, which is most strict. Not limited by theory, it may be entirely possible that any array may transformed to become an AISA array.

The term "AIS," as in AIS-like attributes or AIS-like characteristics, may include but is not intended to be limited to any of the following, and which may refer to AIS, ARIS, ACIS4, and/or AISA processed arrays:

An array whose histogram is moderately to nearly uniformly flat;

An array which contains Type One Noise and/or Type Two Noise;

An array whose maximum intensity value equals the number of pixels in either or both the width and/or length of the array;

An array, if consisting of color channels, whose color balance is altered from normal perceptional expectations;

An array which as a whole or part can utilize itself to verify that it is authentic;

An array which is itself an encryption or decryption codex or produces an encryption or decryption codex;

An array that is quasi-unique, meaning, no additional processing produces a different array and/or any given pixel should have unique (different value) neighbors in its respective row or column—and not necessarily both—but may indeed include unique neighbors in both;

An array that contains a full set of numeric values (for example) with none absent, (e.g., 1 through 256), within every row and/or column and within the entire array (provided proper configuration, this is guaranteed with AIS and AISA and perhaps other embodiments) or nearly every row and/or column and within the entire array (likely for ARIS);

An array that, when altered, no longer can be used in whole or part to verify that itself is authentic;

An array that contains or is its own watermark (is self-authenticatable) that has not been destroyed by processing, and yet which has destroyed other tampering schemes during processing; or An array that, when altered and then reprocessed, may appear to be very similar to a previous version of itself, but where both arrays are authenticatable.

Also, the following may be considered to be "AIS" or AIS-like as they relate to customizable preferences (that may be configured via heretofore known methods) prior to or after AIS, AISA, and/or ARIS processing so as to improve results.

An array whose maximum intensity value equals or nearly equals the maximum possible dynamic range as given by the method that produced the array (e.g., camera), and/or whose minimum intensity value equals or nearly equals 0 or 1;

An array whose maximum intensity value corresponds with a "natural" bit-level (e.g., $2^{8=256}$), and whose minimum intensity value equals 1 (or, respectively, 255 and 0);

An array whose maximum intensity value corresponds to a bit-shifted or scaled version of its former self; or An array that has been cropped, expanded, or otherwise resized.

Throughout this disclosure, only positive, real (as in not imaginary), integer number array values and indices were used in examples. These examples are not intended to limit the scope of potential input candidate values and/or indices: negative, imaginary, fractional, and other forms of symbology are possible.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of this disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing an image comprising:
assigning a value to a plurality of pixels of an image;
placing the values of the plurality of pixels in an array;
determining a sorting indices to sort the array;
determining an output indices to sort the sorting indices;
sorting the array with the sorting indices;
sorting the array with the output indices; and
altering the image based on the sorted array.

2. The method according to claim 1, wherein the sorting the array with the sorting indices and the sorting the array with the output indices includes sorting a column of the array, sorting a row of the array, or combinations thereof.

3. The method according to claim 1, wherein the value is a base-10 numeric value, an alphabetic character, symbolic, binary, hexadecimal value, or mixtures thereof.

4. The method according to claim 1, further comprising recursively sorting the array with the sorting indices and the output indices until a final sorted array does not differ from the sorted array.

5. The method of claim 1, further comprising inserting a watermark on the image.

6. A method of encrypting information, comprising the method of claim 1.

7. The method of claim 1, further comprising recursively sorting the array with the sorting indices and the output indices a desired number of times.

8. The method of claim 1, further comprising recursively sorting the array with the sorting indices and the output indices to obtain a desired normalization of the array.

9. A method of decrypting information, comprising the method of claim 1.

10. The method of claim 1, wherein the image is split into a plurality of arrays.

11. The method of claim 10, wherein the plurality of arrays include an array for each color channel of the image.

12. The method of claim 1, wherein the array is a two-dimensional array.

13. The method of claim 1, further comprising pixel scaling the image.

14. The method of claim 1, further comprising;
determining a second sorting indices to sort the array;

determining a second output indices to sort the sorting indices;
sorting the array with the second sorting indices; and
sorting the array with the second output indices.

15. The method of claim 14, wherein the sorting indices and the second sorting indices are different.

16. The method of claim 1, wherein the sorting indices sorts the array along a diagonal of the array, a chord of the array, or combinations thereof.

17. A method for processing an image comprising:
assigning a value to a plurality of pixels of an image;
randomly placing the value of the plurality of pixels in an array;
determining a sorting indices to sort the array;
determining an output indices to sort the sorting indices;
sorting the array with the sorting indices;
sorting the array with the output indices; and
altering the image based on the sorted array.

18. A method of encrypting information, comprising the method of claim 17.

19. A method of decrypting information, comprising the method of claim 17.

20. The method according to claim 17, wherein the value is a base-10 numeric, an alphabetic character, or mixtures thereof.

21. The method according to claim 17, further comprising recursively sorting the array with the sorting indices and the output indices until a final sorted array does not differ from the sorted array.

22. The method of claim 17, further comprising recursively sorting the array with the sorting indices and the output indices to obtain a desired normalization of the array.

23. A non-transitory computer readable storage medium bearing instructions for processing an image, the instructions, when executed by a processor in electrical communication with the storage medium, cause the processor to perform operations comprising:
assigning a value to a plurality of pixels of an image;
placing the values of the plurality of pixels in an array;
determining a sorting indices to sort the array;
determining an output indices to sort the sorting indices;
sorting the array with the sorting indices;
sorting the array with the output indices; and
altering the image based on the sorted array.

24. The non-transitory computer readable storage medium of claim 23, wherein the instructions cause the processor to encrypt the image, decrypt the image, or a combination thereof.

* * * * *